US008630456B2

(12) United States Patent
Asahara et al.

(10) Patent No.: US 8,630,456 B2
(45) Date of Patent: Jan. 14, 2014

(54) OBJECT RECOGNITION METHOD, OBJECT RECOGNITION APPARATUS, AND AUTONOMOUS MOBILE ROBOT

(75) Inventors: Yoshiaki Asahara, Obu (JP); Takashi Yamamoto, Seto (JP); Mark Van Loock, Westmeerbeek (BE); Bastian Steder, Freiburg (DE); Giorgio Grisetti, Rome (IT); Wolfram Burgard, Denzlingen (DE)

(73) Assignees: Toyota Jidosha Kabushiki Kaisha, Toyota-Shi (JP); Albert-Ludwigs University Freiburg, Freiburg (DE)

( * ) Notice: Subject to any disclaimer, the term of this patent is extended or adjusted under 35 U.S.C. 154(b) by 176 days.

(21) Appl. No.: 13/320,220

(22) PCT Filed: May 12, 2009

(86) PCT No.: PCT/JP2009/059231
§ 371 (c)(1),
(2), (4) Date: Feb. 2, 2012

(87) PCT Pub. No.: WO2010/131371
PCT Pub. Date: Nov. 18, 2010

(65) Prior Publication Data
US 2012/0121132 A1 May 17, 2012

(51) Int. Cl.
*G06K 9/00* (2006.01)
(52) U.S. Cl.
USPC .......................................... 382/103; 382/106
(58) Field of Classification Search
USPC ......... 382/100, 103, 106–107, 115–118, 154, 382/172–173, 195, 224, 288–295; 345/419, 345/427, 473; 356/455–456; 348/77–78; 375/240.12–240.16; 700/47–48; 706/2, 706/16–23; 707/705–707
See application file for complete search history.

(56) References Cited

U.S. PATENT DOCUMENTS 7,463,778 B2 * 12/2008 Damera-Venkata .......... 382/236
7,489,806 B2 * 2/2009 Mohri et al. .................. 382/107
(Continued)

FOREIGN PATENT DOCUMENTS

JP 9-178418 A 7/1997

OTHER PUBLICATIONS

Dibeklioglu, H., et al., "3D Facial Landmarking Under Expression, Pose, and Occlusion Variations," 2nd IEEE International Conference, Sep. 29-Oct. 1, 2008, Arlington, Virginia, pp. 1-6.

(Continued)

*Primary Examiner* — Hadi Akhavannik
*Assistant Examiner* — Mehdi Rashidian
(74) *Attorney, Agent, or Firm* — Kenyon & Kenyon LLP

(57) ABSTRACT

To carry out satisfactory object recognition in a short time. An object recognition method in accordance with an exemplary aspect of the present invention is an object recognition method for recognizing a target object by using a preliminarily-created object model. The object recognition method generates a range image of an observed scene, detects interest points from the range image, extracts first features, the first features being features of an area containing the interest points, carries out a matching process between the first features and second features, the second features being features of an area in the range image of the object model, calculates a transformation matrix based on a result of the matching process, the transformation matrix being for projecting the second features on a coordinate system of the observed scene, and recognizes the target object with respect to the object model based on the transformation matrix.

17 Claims, 16 Drawing Sheets

(56) References Cited

U.S. PATENT DOCUMENTS

| | | | |
|---|---|---|---|
| 8,295,543 B2 * | 10/2012 | Tu et al. | 382/103 |
| 8,391,580 B2 * | 3/2013 | Bornfleth | 382/132 |
| 8,428,304 B2 * | 4/2013 | Kato et al. | 382/103 |
| 8,477,993 B2 * | 7/2013 | Matsuura | 382/103 |
| 2003/0028784 A1 * | 2/2003 | Uchida | 713/186 |
| 2003/0086496 A1 * | 5/2003 | Zhang et al. | 375/240.16 |
| 2003/0169906 A1 * | 9/2003 | Gokturk et al. | 382/115 |
| 2004/0175039 A1 * | 9/2004 | Miller | 382/181 |
| 2005/0063582 A1 * | 3/2005 | Park et al. | 382/154 |
| 2005/0286767 A1 * | 12/2005 | Hager et al. | 382/190 |

OTHER PUBLICATIONS

D.G. Lowe: "Object recognition from local scale-invariant features", In Proc. of the Int. Conf. on Computer Vision (ICCV), Krekyra, Greece, 1999.

Stefan Stiene, Kai Lingemann, Andreas Nuechter, and Joachim Hertzberg: "Contour-based object detection in range images", in 3DPVT '06: Proceedings of the Third International Symposium on 3D Data Processing, Visualization, and Transmission (3DPVT'06), pp. 168-175, Washington, DC, USA 2006, IEEE Computer Society.

Andrew E. Johnson, and Martial Hebert: Using Spin Images for Efficient Object Recognition in Cluttered 3D Scenes, IEEE Transactions on Pattern Analysis and Machine Intelligence, vol. 21, No. 5, May 1999.

Chen et al.: "3D free-form object recognition in range images using local surface patches", Pattern Recognition Letters, Elsevier, Amsterdam, NL, vol. 28, No. 10, Jul. 15, 2007, pp. 1252-1262.

Gong et al.: "Data processing for real-time construction site spatial modeling", Automation in Constructions, Elsevier Science Publishers, Amsterdam, NL, vol. 17, No. 5, pp. 526-535, Oct. 15, 2007.

Yacoob Y. et al.: "3D object recognition via simulated particles diffusion", Computer Vision and Pattern Recognition, 1989, Proceedings CVPR '89, IEEE Computer Society Conference on San Diego, CA, USA, Jun. 4-8, 1989, Washington, DC, USA, IEEE Computer Society PR, US, Jun. 4, 1989. pp. 442-449.

\* cited by examiner

Fig. 6
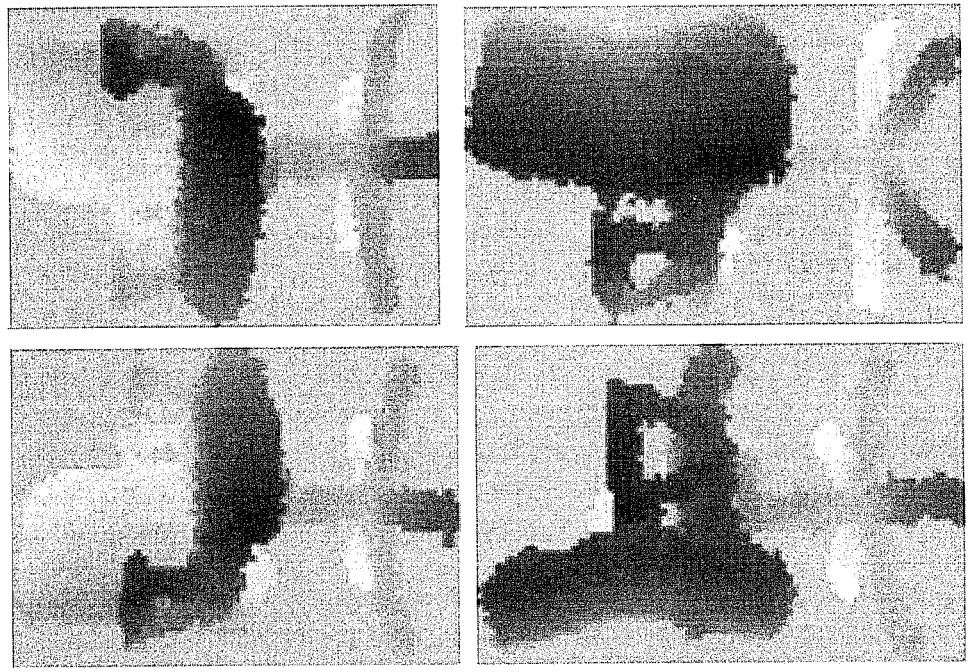
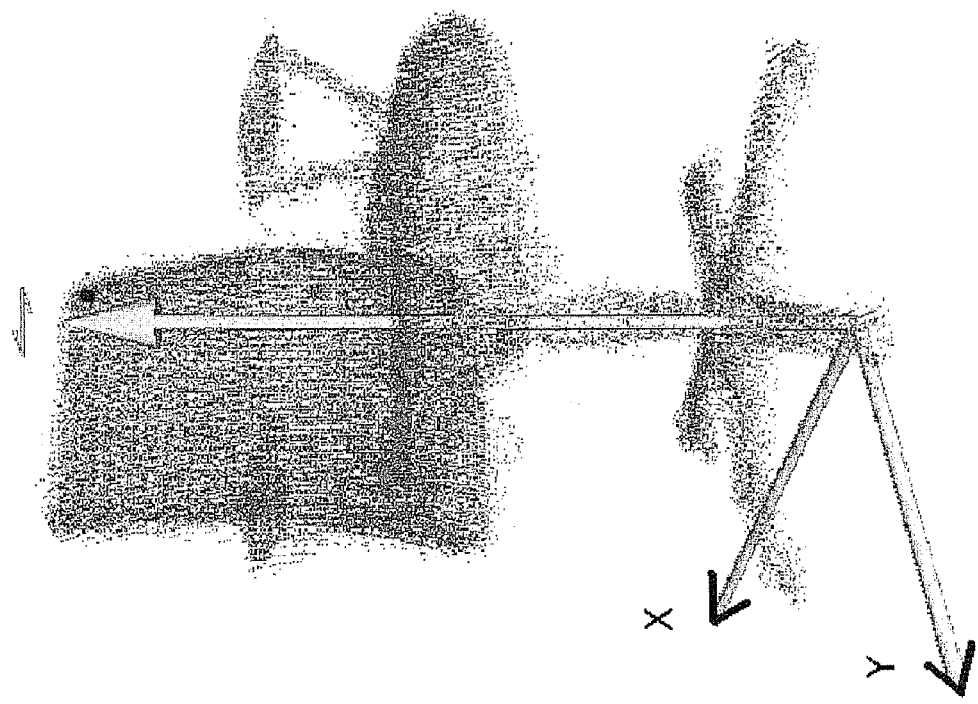

Fig. 13

| model | Real scene object | | | | | | | |
|---|---|---|---|---|---|---|---|---|
| | Box | Fan | Office chair | Monitor | Pioneer robot | Table | Wooden chair | Clutter |
| Box | 8 | 0 | 3 | 0 | 0 | 0 | 0 | 4 |
| Fan | 0 | 7 | 0 | 0 | 0 | 0 | 0 | 0 |
| Office chair | 2 | 2 | 10 | 1 | 0 | 0 | 1 | 4 |
| Monitor | 0 | 1 | 0 | 8 | 0 | 0 | 2 | 0 |
| Pioneer robot | 0 | 0 | 0 | 0 | 10 | 0 | 0 | 3 |
| Table | 0 | 0 | 0 | 0 | 0 | 7 | 0 | 1 |
| Wooden chair | 0 | 2 | 0 | 3 | 0 | 0 | 9 | 0 |

Fig. 16

| Visibility | 100% | 75% - 90% | 50% - 75% | 25% - 50% | < 25% |
|---|---|---|---|---|---|
| Office chair | 9 | 9 | 8 | 7 | 2 |
| Table | 10 | 9 | 8 | 4 | 0 |

OBJECT RECOGNITION METHOD, OBJECT RECOGNITION APPARATUS, AND AUTONOMOUS MOBILE ROBOT

This is a 371 national phase application of PCT/JP2009/059231 filed 12 May 2009, the contents of which are incorporated herein by reference.

TECHNICAL FIELD

The present invention relates to an object recognition method and an object recognition apparatus and an autonomous mobile robot, in particular to an online object recognition method and apparatus and an autonomous mobile robot based on a range image.

BACKGROUND ART

The development of object recognition methods for service robotics is in progress. An autonomous mobile robot that autonomously moves in an environment requires the skill to recognize objects existing in its surrounding environment and to determine what they are in order to implement high-level interaction with those objects. Non-patent documents 1 to 3 and Patent document 1 disclose object recognition techniques in the related art.

In particular, Non-patent document 1 discloses a vision-based object recognition technique. In Non-patent document 1, an object is recognized based on SIFT features by using images taken by a normal camera. According to the vision-based object recognition technique disclosed in Non-patent documents 1, object recognition can be performed in a short time. Furthermore, it is possible to achieve robust object recognition even in partially occluded scenes.

Non-patent document 2 discloses an object recognition technique based on contours. In Non-patent document 2, an object is recognized based on 200D (200-dimensional) feature vectors for the entire object by using a single range image. In Non-patent document 2, the learning and classification of an object using the 200D feature vectors are carried out by a support vector machine. According to Non-patent document 2, the object recognition technique disclosed therein can achieve very fast calculation for the object recognition.

Non-patent document 3 discloses an object recognition technique using spin images (3D features). In Non-patent document 3, an object is recognized based on high-dimensional features that are extracted from 3D (three-dimensional) point clouds according to the normal direction of the object surface. It should be noted that points in the 3D data are mostly obtained by a laser sensor. According to Non-patent document 3, the object recognition technique disclosed therein can recognize an object independent of the viewpoint (i.e., invariant with regard to viewing pose).

Furthermore, Patent document 1 discloses a 3D position detection apparatus capable of recognizing a reference surface by using both a 3D position sensor and a range sensor.

CITATION LIST

Patent Literature

[Patent Document 1]
Japanese Unexamined Patent Application Publication No. 9-178418

Non Patent Literature

[Non-Patent Document 1]
D. G. Lowe, Object recognition from local scale-invariant features. In Proc. Of the Int. Conf on Computer Vision (ICCV), Krekyra, Greece, 1999.
[Non-Patent Document 2]
Stefan Stiene, Kai Lingemann, Andreas N"uchter, and Joachim Hertzberg. Contour-based object detection in range images. In 3DPVT '06: Proceedings of the Third International Symposium on 3D Data Processing, Visualization, and Transmission (3DPVT'06), pages 168-175, Washington, D.C., USA, 2006. IEEE Computer Society.
[Non-Patent Document 3]
Andrew E. Johnson, and Martial Hebert, Using Spin Images for Efficient Object Recognition in Cluttered 3D Scenes, IEEE TRANSACTIONS ON PATTERN ANALYSIS AND MACHINE INTELLIGENCE, VOL. 21, No. 5, MAY 1999.

SUMMARY OF INVENTION

Technical Problem

All the problems in object detection/recognition consist of a number of facets that need to be tackled for real-world applications. The main problems that make object recognition very difficult include the fact that the high dimensionality of the search space does not allow brute-force calculations to be carried out in real-time. The origin of this high dimensionality problem lies in the huge amount of data to be processed for both the environment model (+/−150,000 scan points) and the object to be detected.

The object recognition technique disclosed in Non-patent document 1 has a problem that the technique heavily depends on the texture of an object. For example, in a case where the surface of an object is pure white, when it is saturated by sunlight or the like or when a similar situation occurs, the recognition becomes very difficult.

The object recognition technique disclosed in Non-patent document 2 uses the contour (silhouette) of an object for recognition, and therefore has a problem that the technique is very sensitive even to slight occlusion. This is because even slight occlusion makes the silhouette look very different. Furthermore, since the object recognition technique disclosed in Non-patent document 2 does not use all object information (i.e., it uses only the contour information), it occasionally produces non-optimal results (i.e., it sometimes cannot recognize properly). Furthermore, since the object recognition technique disclosed in Non-patent document 2 distinguishes the border between an object and the floor in the range image, it has another problem that floor information also needs to be extracted.

In the object recognition technique disclosed in Non-patent document 3, the normal is not very stable in an area of interest (in a discontinuous area). Therefore, there is a problem that it requires a lot of CPU time to acquire stable normals. Furthermore, the document does not have any statement about the extraction of an interest point.

The 3D position detection apparatus disclosed in Patent document 1 detects a reference surface by using two measurement points. Therefore, objects to be recognized are limited to flat surfaces. That is, there is a problem that the technique cannot recognize arbitrary objects and thus cannot identify the positions of such objects.

Accordingly, an exemplary object of the present invention is to solve the above-mentioned problems and to provide an object recognition method and an object recognition apparatus and an autonomous mobile robot capable of satisfactorily recognizing an object in a short time.

Solution to Problem

An object recognition method in accordance with a first exemplary embodiment of the present invention is an object recognition method for recognizing a target object contained in an observed scene by using a preliminarily-created object model, the object recognition method including: a step for generating a range image of the observed scene; a step for detecting interest points from the range image; a step for extracting first features, the first features being features of an area containing the interest points; a step for carrying out a matching process between the first features and second features, the second features being features of an area in the range image of the object model; a step for calculating a transformation matrix based on a result of the matching process, the transformation matrix being for projecting the second features on a coordinate system of the observed scene; and a step for recognizing the target object with respect to the object model based on the transformation matrix.

Since the range image of the observed scene is generated and matching is carried out with an object model using the features of the interest point detected from the range image, the matching process between the observed scene and the object model is performed in the range image, i.e., in the 2D (two-dimensional) data, and thereby the object recognition can be performed in a short time. Furthermore, since the interest point is detected from the range image of the observed scene and matching is carried out with the object model, it is possible to perform robust object recognition even for a target object that is partially occluded.

Furthermore, the object recognition method may further include a step for generating a 3D point cloud of the observed scene by using a laser sensor, so that the range image may be generated from the generated 3D point cloud. In this way, since the recognition process is carried out by using the range image generated from the 3D point cloud, the problems, which would otherwise be caused by saturation or the like, can be avoided. Furthermore, by generating a range image by using 3D point clouds containing all the information of the target object, it is possible to implement the matching from any given direction.

Furthermore, the object recognition method may further include a step for generating a 3D point cloud of the observed scene by using a laser sensor, and a step for extracting third features from the 3D point cloud of the observed scene, the third features being features of a line contained in the target object. The step for carrying out the matching process may carry out a matching process between the third features and fourth features, the fourth features being features of a line of the object model. The step for calculating a transformation matrix may calculate a transformation matrix based on a result of the matching process, the transformation matrix being for projecting the third features on the coordinate system of the observed scene.

Furthermore, the object recognition method may further include a step for verifying the validity of the transformation matrix. The step for calculating the transformation matrix may calculate a plurality of candidate transformation matrices from the correspondences between the first features and the second features obtained by the matching process, the plurality of candidate transformation matrices being for projecting the second features on a coordinate system of the observed scene. The step for verifying the validity of the transformation matrix may project the second features on the observed scene based on each of the transformation matrices and calculate scores based on the degree of similarity between the projected second features and the first features, and then verify the validity of each of the transformation matrices based on the calculated scores.

Furthermore, the step for verifying the validity of the transformation matrix may classify the plurality of the transformation matrices in each local area containing the target object, and select one transformation matrix for each of the local areas according to the scores.

Furthermore, when the second features are disposed based on the transformation matrices that are selected for each of the local areas, the step for verifying the validity of the transformation matrix may detect a collision between object models of the disposed second features, and verify the validity of the transformation matrices that are selected for each of the local areas according to the detected collision situation.

Furthermore, the step for verifying the validity of the transformation matrix may discard transformation matrices for which the scores are lower than a predefined threshold among the plurality of the transformation matrices.

Furthermore, the object recognition method may further include a step for verifying the validity of the transformation matrix. The step for calculating the transformation matrix may calculate a plurality of candidate transformation matrices from the correspondences between the first features and the second features obtained by the matching process, the plurality of candidate transformation matrices being for projecting the second features on the coordinate system of the observed scene. The step for verifying the validity of the transformation matrix may discard transformation matrices that have a restrained rotational component among the plurality of the transformation matrices.

Furthermore, the object recognition method may further include a step for verifying the validity of the transformation matrix. The step for calculating the transformation matrix may calculate a plurality of candidate transformation matrices from the correspondences between the first features and the second features obtained by the matching process, the plurality of candidate transformation matrices being for projecting the second features on the coordinate system of the observed scene. When the second features are disposed based on each of the transformation matrices, the step for verifying the validity of the transformation matrix may generate a range image from the disposed second features, and verify the validity of each of the transformation matrices according to the degree of similarity between the generated range image and a range image of a part containing the target object extracted from the range image of the observed scene.

Furthermore, the object recognition method may further include a step for outputting an object model recognized as the target object in a state where the object model is disposed in the coordinate system of the observed scene based on the transformation matrix.

An object recognition apparatus in accordance with a second exemplary embodiment of the present invention is an object recognition apparatus for recognizing a target object contained in an observed scene by using a preliminarily-created object model, the object recognition apparatus including: range image generation means that generates a range image of the observed scene; interest point detection means that detects an interest point from the range image; area feature extraction means that extracts first features, the first features being features of an area containing the interest point; and matching/verification process means that: carries out a matching process between the first features and second features, the second features being features of an area in the range image of the object model; calculates a transformation matrix based on a result of the matching process, the transformation matrix being for projecting the second features on a coordinate system of the observed scene; and recognizes the target object with respect to the object model based on the transformation matrix.

An autonomous mobile robot in accordance with a third exemplary embodiment of the present invention is an autonomous mobile robot that creates map information by using a recognition result of an object existing in the environment and autonomously moves by referring to the created map information, the autonomous mobile robot including: range image generation means that generates a range image of an observed scene; interest point detection means that detects an interest point from the range image; area feature extraction means that extracts first features, the first features being features of an area containing the interest point; and matching/verification process means that: carries out a matching process between the first features and second features, the second features being features of an area in the range image of a preliminarily-created object model; calculates a transformation matrix based on a result of the matching process, the transformation matrix being for projecting the second features on a coordinate system of the observed scene; and recognizes the target object contained in the observed scene with respect to the object model based on the transformation matrix.

Advantageous Effects of Invention

The present invention can provide an object recognition method and an object recognition apparatus and an autonomous mobile robot capable of satisfactorily recognizing an object in a short time.

BRIEF DESCRIPTION OF DRAWINGS

FIG. 6 is an image illustrating an example of an object model of a chair in accordance with a first exemplary embodiment of the present invention;

FIG. 13 is a table showing a recognition rate for a group of objects in accordance with a first exemplary embodiment of the present invention.

FIG. 16 is a table showing a recognition result for objects (an office chair and a table) under the circumstance shown in FIG. 15.

DESCRIPTION OF EMBODIMENTS

First Embodiment

<Configuration>

The present invention relates to an object recognition technique to detect an object online (in real time) by using a range image. The present invention can be applied, for example, to autonomous mobile robots that autonomously move in an environment. Exemplary embodiments of the present invention are explained hereinafter with reference to the drawings.

Figure 1:
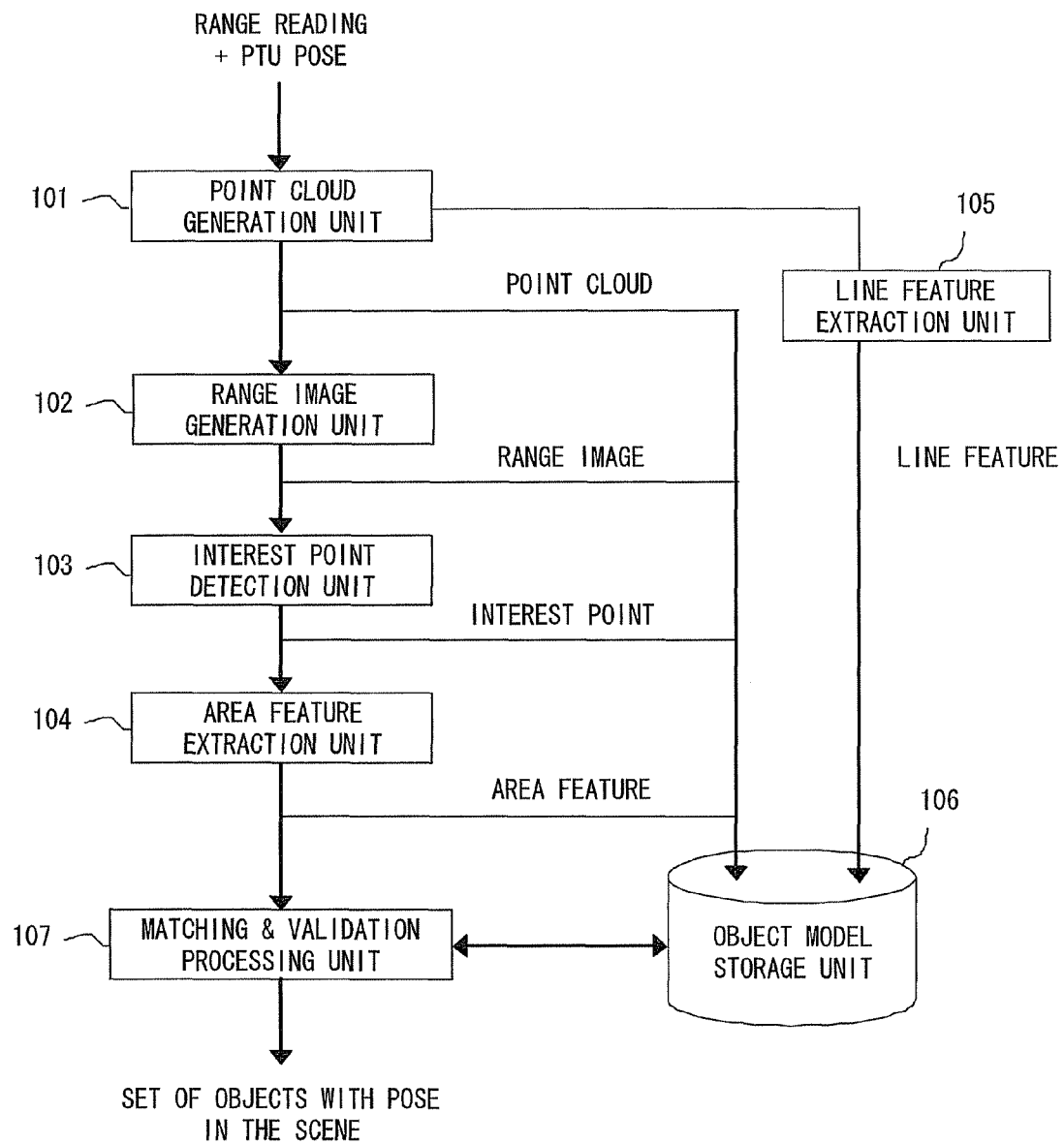
FIG. 1 is a configuration diagram illustrating an object recognition system in accordance with a first exemplary embodiment of the present invention.

Firstly, a system configuration of an object recognition apparatus in accordance with a first exemplary embodiment of the present invention is explained with reference to FIG. 1. A point cloud generation unit 101 generates 3D (three-dimensional) point clouds of an object contained in an observed scene. The 3D point clouds can be generated by using a laser sensor. The 3D point cloud is a set of 3D data points each of which has respective values on x, y, and z axes. As explained later, when a target object is to be detected, the object can be recognized based on 3D point clouds that are actually obtained from the observed scene and 3D point clouds of an object model. Note that, in a first exemplary embodiment of the present invention, the saturation issues (illumination issues), which commonly occur when a camera is used, can be avoided by using a laser range sensor that acquires measured data on the distance to an object by the TOF (Time Of Flight) principle.

A range image generation unit 102 generates a range image in the observed scene and a range image of the object model from the generated 3D point clouds.

An interest point detection unit 103 detects an interest point from the range image. An area feature extraction unit 104 extracts a patch, i.e., features of an area containing the interest point. Meanwhile, a line feature extraction unit 105 extracts line features of the object from the 3D point clouds.

An object model storage unit 106 stores preliminarily-created object models of target objects. An object model is composed of 3D point clouds and the like of a target object.

A matching/verification process unit 107 carries out the matching and verification processes for the features of the observed scene and the features of the object model. Specifically, the matching/verification process unit 107 first carries out a matching process between a patch from the observed scene and the features of the object model. Then, it calculates transformation matrices that are used to project the features of the object model on the coordinate system of the observed scene based on the result of the matching process. Next, it verifies the validity of the transformation matrices, and discards improper transformation matrices. Finally, the matching/verification process unit 107 recognizes the target object with respect to the object model based on the verified transformation matrices.

<Processing Operation>

Figure 2:
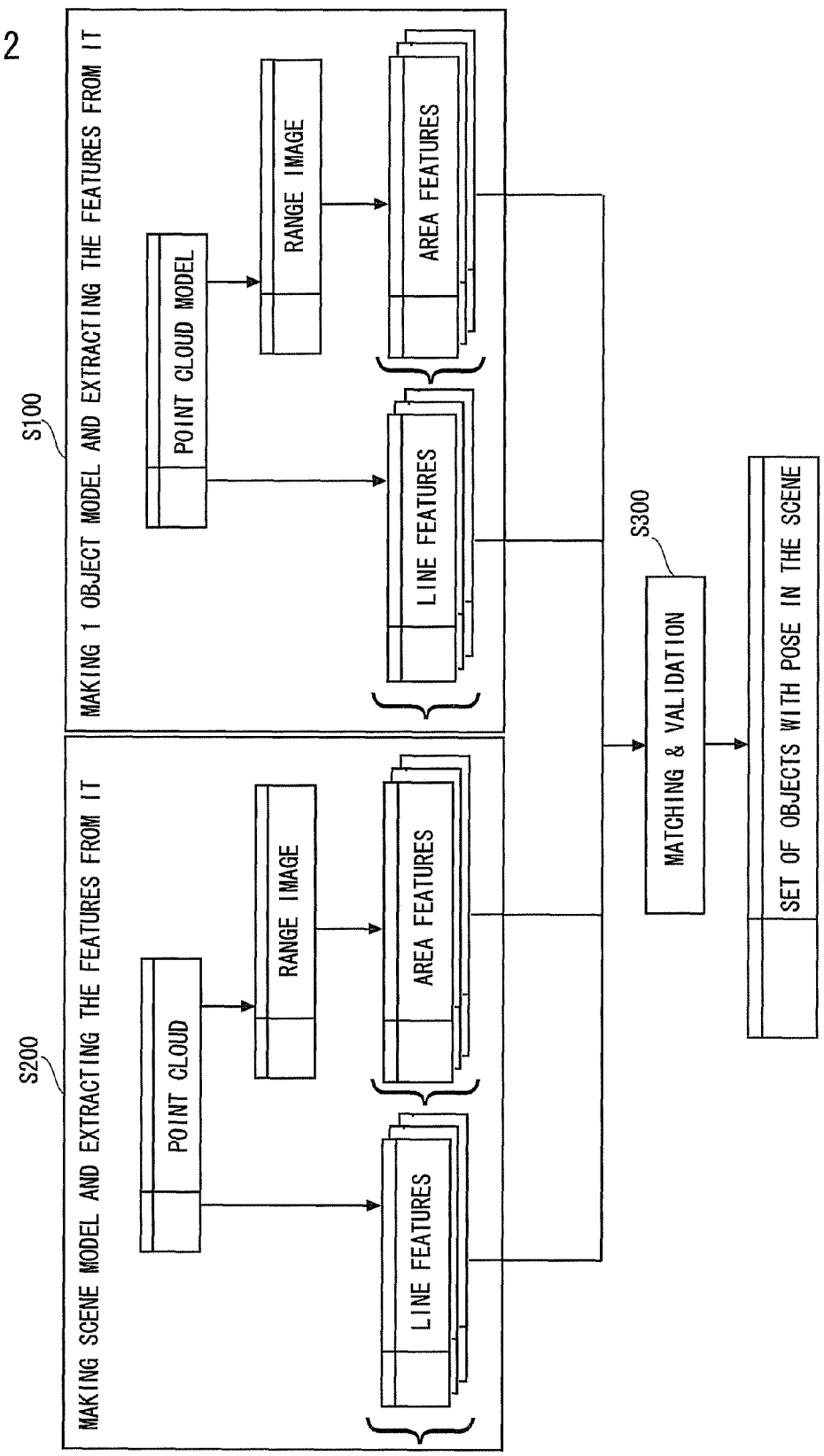
FIG. 2 is a flowchart schematically illustrating processing operations of object recognition in accordance with a first exemplary embodiment of the present invention.

Next, an object recognition processing operation in accordance with an exemplary aspect of the present invention is explained hereinafter with reference to FIG. 2 to FIG. 11. FIG. 2 is a flowchart schematically illustrating an object recognition processing operation in accordance with an exemplary aspect of the present invention. In FIG. 2, a step S100 represents a point cloud generation process and a features-extraction process for a single object model. A step S200 represents a point cloud generation process and a features-extraction process for an actual observed scene.

In the step S100, when a new 3D scan of the observed scene is acquired, a corresponding range image is computed from this scan data. Then, a set of area features and a set of line features are extracted from this image. The processes in the step S100 are carried out in advance of the object recognition process, and point clouds and features for a plurality of objects are stored in the object model storage unit 106. In the step S200, in order to carry out object recognition for the observed scene, a range image is generated and features are extracted from the actual observed scene in a similar manner to the step S100.

In a step S300, matching is carried out between the features in the observed scene and the features of the object model, and verification is carried out on transformation matrices obtained by the matching. As a result of the object recognition, the object model is displayed by disposing it in the observed scene. To this end, an initial set of potential alignments is determined. A candidate potential alignment is a transformation matrix used to transform the object model into a position and pose in the coordinate system of the observed scene. The matching is carried out by using the features in the observed scene and the features of the corresponding object model, and the transformation matrices are calculated from the matching result. Furthermore, verification is carried out on the calculated transformation matrices. For the feature matching and the verification of transformation matrices, a GOODSAC-like procedure is used and the solutions (transformation matrices) are ranked based on a score function that is given to each transformation matrix. After filtering out unnecessary solutions, each of the object models are displayed in the observed scene as the final recognition result in a state where each object is aligned based on the determined transformation matrix.

Figure 3:
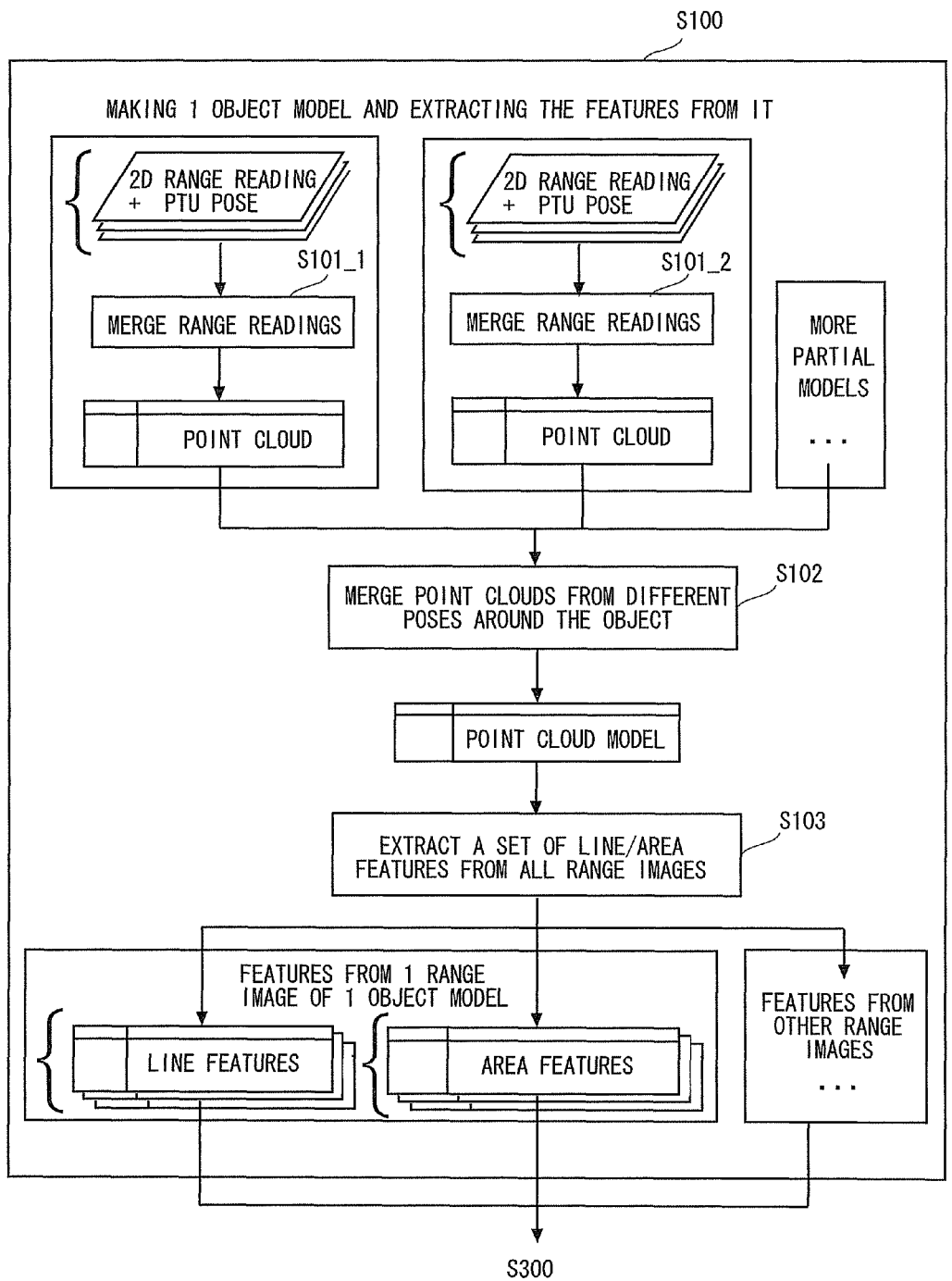
FIG. 3 is a flowchart illustrating a point cloud generation process and a features-extraction process in accordance with a first exemplary embodiment of the present invention.

Next, the details of the processes in the step S100 are explained hereinafter with reference to FIG. 3. FIG. 3 is a flowchart illustrating a point cloud generation process and a features-extraction process for a single object. Firstly, in a step S101, point clouds are generated by merging 2D (two-dimensional) range measurements acquired by a laser range sensor based on pose information of a PTU (Pan Tilt Unit: mechanism for rotating/swinging a sensor). Next, in a step S102, point clouds of the object are generated by merging a plurality of point clouds each of which is a partial point cloud of the object acquired from a different direction. Next, in a step S103, a set of line features or area features is extracted from all range images generated from the point clouds of the object model. Furthermore, these point clouds, range images, interest points, and features acquired from real 3D data are used as an object model for a single object, and a set of object models composed of a plurality of objects is stored in an object model storage unit 106.

Figure 4:
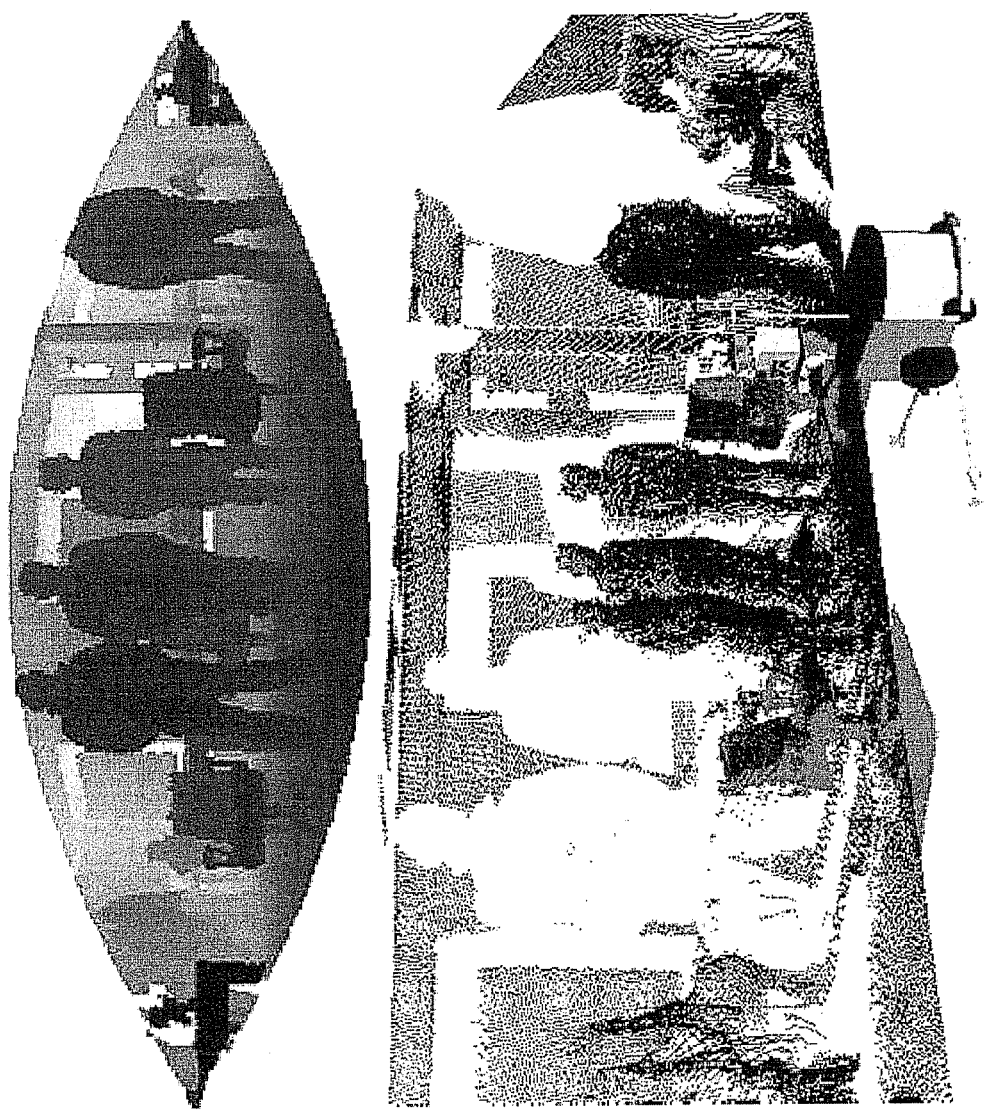
FIG. 4 shows examples of an image of point clouds (bottom part) and a range image (top part) in accordance with a first exemplary embodiment of the present invention.

A Range image is a 2D visual representation of a 3D scene. The grey-value of each pixel in the range image is proportional to the range value (distance) of the closest object in the direction of the ray of light corresponding to that pixel. A range image can be generated by using publicly-known techniques. For example, they can be calculated efficiently from a 3D scan by implementing a z-buffer. FIG. 4 shows examples of an image of point clouds (bottom part) and a range image generated from the point clouds (top part). The image of a point cloud shown in the bottom part of FIG. 4 illustrates an observed scene in which a robot, several people, and two recognized chairs are drawn. In the figure, the coordinate system of the robot is defined in such a manner that the front-behind direction is x-axis direction with the front direction being positive direction, the left-right direction is y-axis direction with the left direction being positive direction, and the up-down direction is z-axis direction with the upward direction being positive direction. Note that in the range image shown in the top part of FIG. 4, the image is rendered in such a manner that the grey-value of pixels becomes darker with decrease in the distance to the object.

If all points (pixels) in a range image are used in the recognition process, the process would be too computationally demanding for online object detection. Therefore, a set of interest points is extracted from a range image, instead of using all the pixels in the range image. Interest points can be extracted using publicly-known techniques. For example, the Harris Detector can be used to extract interest points. Then, for each interest point, a set of pixels contained in an area surrounding the interest point is generated as a small patch of the range image, and the patch is extracted as a feature of the area of the interest point. In this example, an area that is centered on the interest point and has a size of 6×6 pixels is defined as a patch.

It should be noted that in order to enforce a certain degree of scale invariance in the patch generation process, the range value of the pixel located on the center of the patch is defined as a reference value and the range values of other pixels contained in the patch are shifted so that a fixed size can be used for patches in the real world. To be more specific, in order to enable the same way of viewing for patches regardless of the difference in distance to the patches, it is necessary to normalize the range values of respective pixels by using the range values of the pixels contained in the patches. Therefore, for example, assuming that the range value of the pixel located on the center of the patch is 1.0 m, the range values of all the remaining pixels contained in the same patch are subtracted by 1.0 m. So that all patches are generated based on windows whose sizes are the same in the world.

Figure 5:
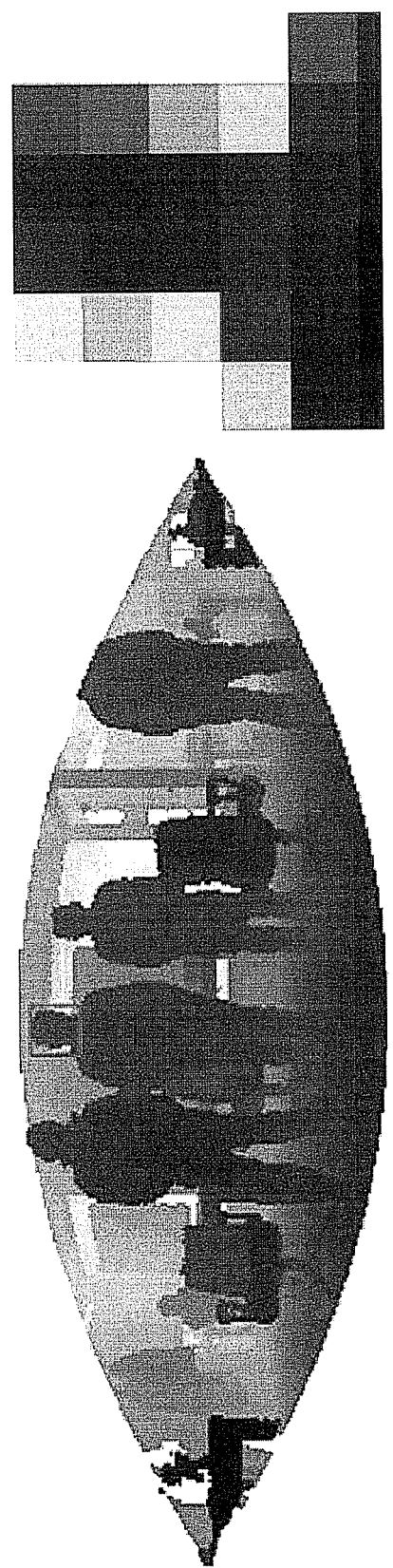
FIG. 5 shows examples of a range image (left side) and an image of a patch (right side) in accordance with a first exemplary embodiment of the present invention.

FIG. 5 shows examples of a range image (left) and an image of a patch in the range image (right). The patch shown in the right part of FIG. 5 is a set of pixels centered on an interest point located in the head of the middle person in the range image shown in the left part of FIG. 5 (that is, a patch representing a range corresponding to the head of the person enclosed by a rectangle in the left part of the figure). Furthermore, the patch shown in the right part of FIG. 5 is a low-resolution image created by interpolating between range values of respective pixels contained in the patch.

As mentioned above, the object models are given as sets of features extracted from the range image of the objects, and the range image itself is generated from point clouds obtained by scanning the objects from different viewpoints. FIG. 6 is an image illustrating an example of an object model of a chair. In particular, the left part of FIG. 6 shows the point cloud model of the chair, and the right part shows a plurality of range images from different perspectives around the chair that are generated from those point clouds.

Figure 7:
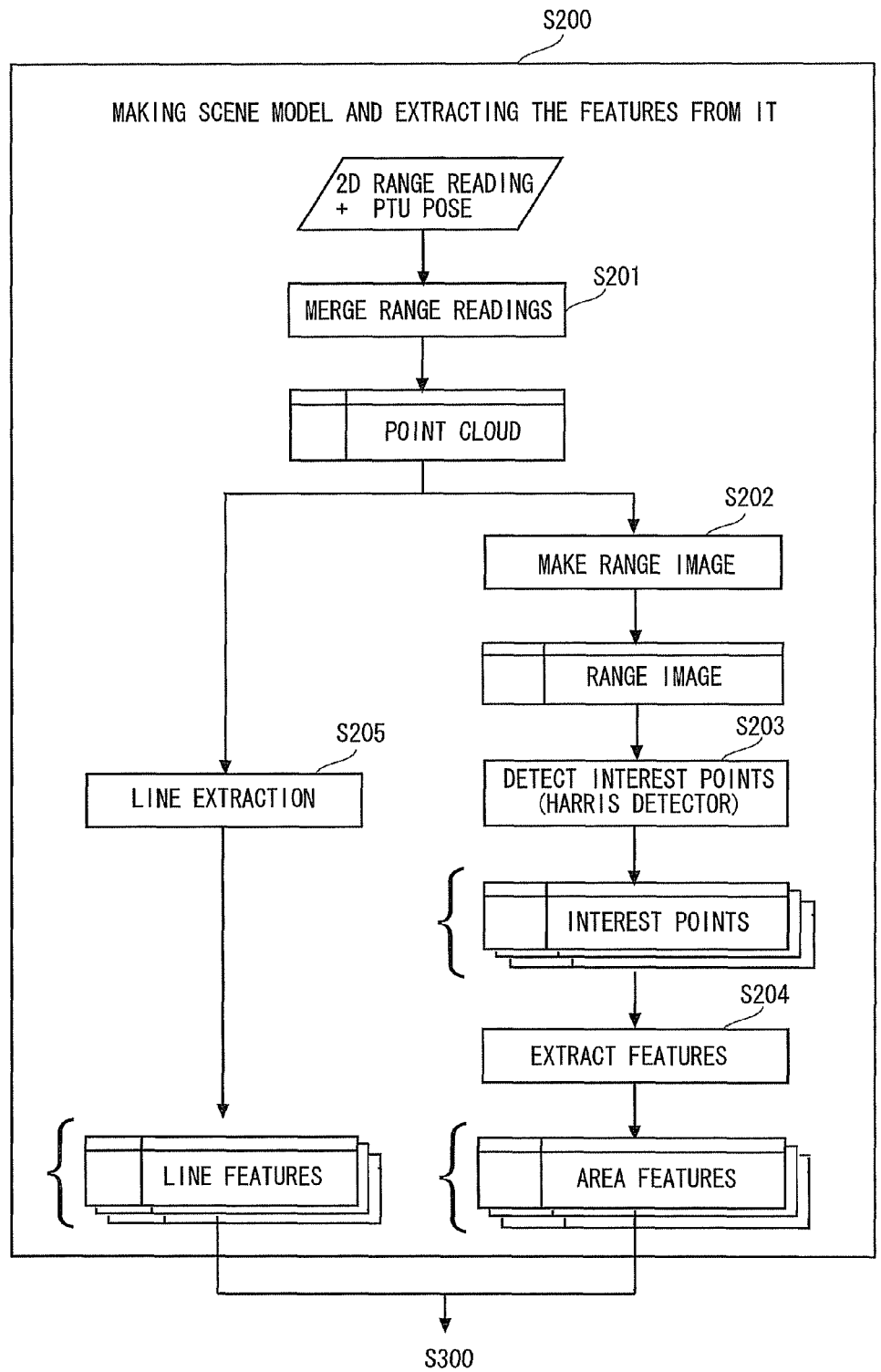
FIG. 7 is a flowchart illustrating a model generation process and a features-extraction process for an observed scene in accordance with a first exemplary embodiment of the present invention.

Next, the details of the processes in the step S200 are explained hereinafter with reference to FIG. 7. FIG. 7 is a flowchart illustrating a point cloud generation process and a features-extraction process for a current observed scene. Firstly, point clouds are generated by merging 2D range measurements acquired from a laser range sensor based on pose information of a PTU in a step S201. In a step S202, a range image is generated from the point clouds. In a step S203, interest points are detected by using the Harris Detector. In a step S204, features (patches) of an area are extracted from the range image. Furthermore, line features are extracted from the point clouds in a step S205. Note that the details of the extraction process for the line features in the step S205 will be explained later.

Figure 8:
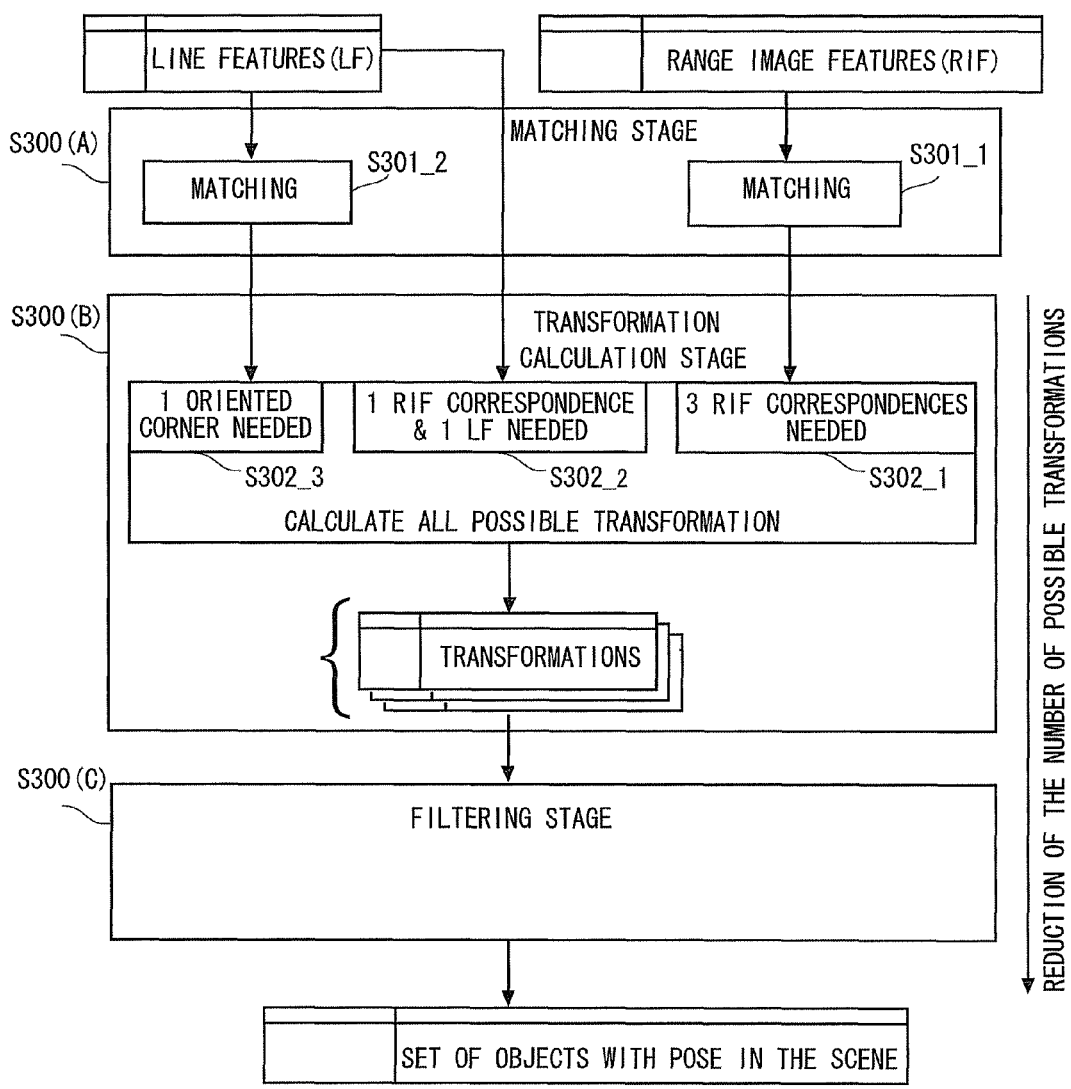
FIG. 8 is a flowchart illustrating the details of a matching process of features and a verification process of a transformation matrix in accordance with a first exemplary embodiment of the present invention.

Next, the details of the processes in the step S300 are explained hereinafter with reference to FIG. 8. FIG. 8 is a flowchart illustrating the details of a features-matching process and a transformation matrix verification process. As shown in FIG. 8, a features-matching process, a transformation matrix calculation process, and a transformation matrix filtering process are performed in a step S300(A), a step S300(B), and a step S300(C) respectively.

Firstly, the feature matching process in the step S300(A) is explained hereinafter. The feature matching is performed by treating the small range image patches as feature vectors (in this example, vectors composed of 36 elements for 6×6 pixels) and searching for the closest feature vectors in a feature space. Specifically, for each feature vector $f_{s,i}$ in the actual observed scene and each feature vector $f_{m,j}$ in the object model, the Euclidean distance $d(f_{s,i}, f_{m,j})$ between their descriptor vectors is computed. Based on these distances, a set of potential correspondences $C=\{C_{i,j}\}(C_{i,j}<f_{s,i}, f_{m,j}>)$, which are given by all feature pairs $<f_{s,i}, f_{m,j}>$ whose distances are below a predefined threshold $d_{max}$, is created.

In a step S301_1, feature matching is carried out by using feature vectors in the range image of the object model and feature vectors in the range image of the actual observed scene. In a step S301_2, matching is carried out with regard to line features between the feature vectors of the object model and the actual observed scene. Note that the line features are explained later.

Publicly-known techniques can be applied to carry out the search for the closest points between the descriptor vectors at high speeds. For example, the search for the closest points can be performed at high speeds by storing all feature descriptor vectors to be compared in a kd-tree and applying the best-bins-first technique proposed by Lowe to handle the high dimensional vectors (see Non-patent document 1).

Next, a calculation process for a transformation matrix in the step S300(B) is explained hereinafter. As described above, since the range image contains the entire information of a 3D scan, it is possible to align the range image of the object model with that of the current observed scene. Furthermore, if at least three correct correspondences between features in the observed scene and those in the model are known, it is possible to compute the 3D transformation matrix between them.

In a step S302_1, a transformation matrix is calculated from the three correspondences from the range images (i.e., by using correspondences between three interest points extracted from the range image of the object model and three interest points extracted from the range image of the observed scene). In a step S302_2, a transformation matrix is calculated from correspondences between a pair of range images and a pair of line features (i.e., a correspondence between a pair of interest points each extracted from the range image of the object model and the range image of the observed scene, and a correspondence between a pair of line features each extracted from the object model and the observed scene). In a step S302_3, a transformation matrix is calculated from a pair of corners (i.e., from a correspondence between a pair of corners each extracted from the object model and the observed scene). Explanation is made hereinafter by taking the process in the step S302_1 as an example.

It should be noted that when the transformation matrices are to be calculated from the results of the feature matching, it is preferable to reject false feature matches by using a deterministic variant of RANSAC. False feature matches occur, if two image patches that do not come from the same place are matched because they look similar. The deterministic variant of RANSAC is a kind of RANSAC that also takes the quality of feature matching (in terms of the Euclidean distance between the descriptor vectors) into account and carries out no random sampling. Furthermore, unlike the ordinary RANSAC, it evaluates feature vectors in a prescribed order, and thus is referred to as "deterministic RANSAC". Since GOODSAC was already mentioned in the text, it could be used here again.

A specific calculation process of a transformation matrix is explained hereinafter. For simplicity of notation, the elements of C (a set of feature vector pairs) are simply referred to as c, neglecting the indices i and j. A possible pose of the object (i.e., a transformation matrix between the point clouds of the current observed scene and the point clouds of the object model) is determined by three correspondences. Accordingly, the number of possible transformation matrices is proportional to $|C|^3$. In this example, the computational requirements of this approach are first reduced by sorting the correspondences based on their descriptor vector distances and taking only the best n correspondences (i.e., n correspondences having smaller distances) into account. A set of n correspondences, which is sorted and then ordered, are referred to as $C'=\{c'_1, \ldots, c'_n\}$. In this way, the processes can be carried out in the increasing order of distance between the descriptor vectors from the correspondence having the smaller distance (i.e., from the pair of the most resembling feature vectors).

Next, to calculate a transformation matrix, the triples having the best correspondences are obtained (according to the descriptor vector distance). However, in the calculation of a transformation matrix, when one of the three correspondences that have low descriptor vector distances is a false match, the search may not be completed by just selecting triples of correspondences according to the distance. To be more specific, assume a case where, for example, there are five interest points and their correspondences are sorted based on distance, and the respective correspondences are simply referred to as 1, 2, 3, 4 and 5. When triples of correspondences are simply acquired from a correspondence having smaller distance, they are selected in the following order: (1, 2, 3), (1, 2, 4), (1, 2, 5), (1, 3, 4), (1, 3, 5), (1, 4, 5), (2, 3, 4), (2, 3, 5), (2, 4, 5), (3, 4, 5), . . . . At this point, when the correspondence 1 is a false match, the first six calculations are performed for the faulty triples of correspondences, and thus requiring an unnecessarily long time to reach the optimal solution. By contrast, if triples are selected in the order that is determined in accordance with the loop structure explained below, they are selected in the following order: (1, 2, 3), (1, 2, 4), (1, 3, 4), (2, 3, 4), (1, 2, 5), (1, 3, 5), (2, 3, 5), (1, 4, 5), (2, 4, 5), (3, 4, 5), . . . . In this order, since triples of correspondences containing the correspondence 1 are not processed for several times in a row, it can eliminate a wastefully long calculation time.

Therefore, triples of correspondences ($c_i$, $c_j$, $c_k$) are selected from a correspondence set C' that is sorted in the order defined by the loop structure explained below. As a result, the sequence ($c'_1$, $c'_2$, $c'_3$), ($c'_1$, $c'_2$, $c'_4$), ($c'_1$, $c'_3$, $c'_4$), ($c'_2$, $c'_3$, $c'_4$), $c'_2$, $c'_s$), . . . is generated.

```
<Loop structure>
FOR(k=3;k·|C|;k=k+1){
    FOR(j=2;j·k;j=j+1){
        FOR(i=1;i<j;i=i+1){
            triple=(c_i,c_j,c_k)
            ...
        }
    }
}
```

A triple ($c'_a$, $c'_b$, $c'_c$) of correspondences generated in the above-described manner is used to compute a candidate transformation matrix $T_{abc}$. A verification process for this candidate transformation matrix is carried out in a step S300(C) explained below.

Figure 9:
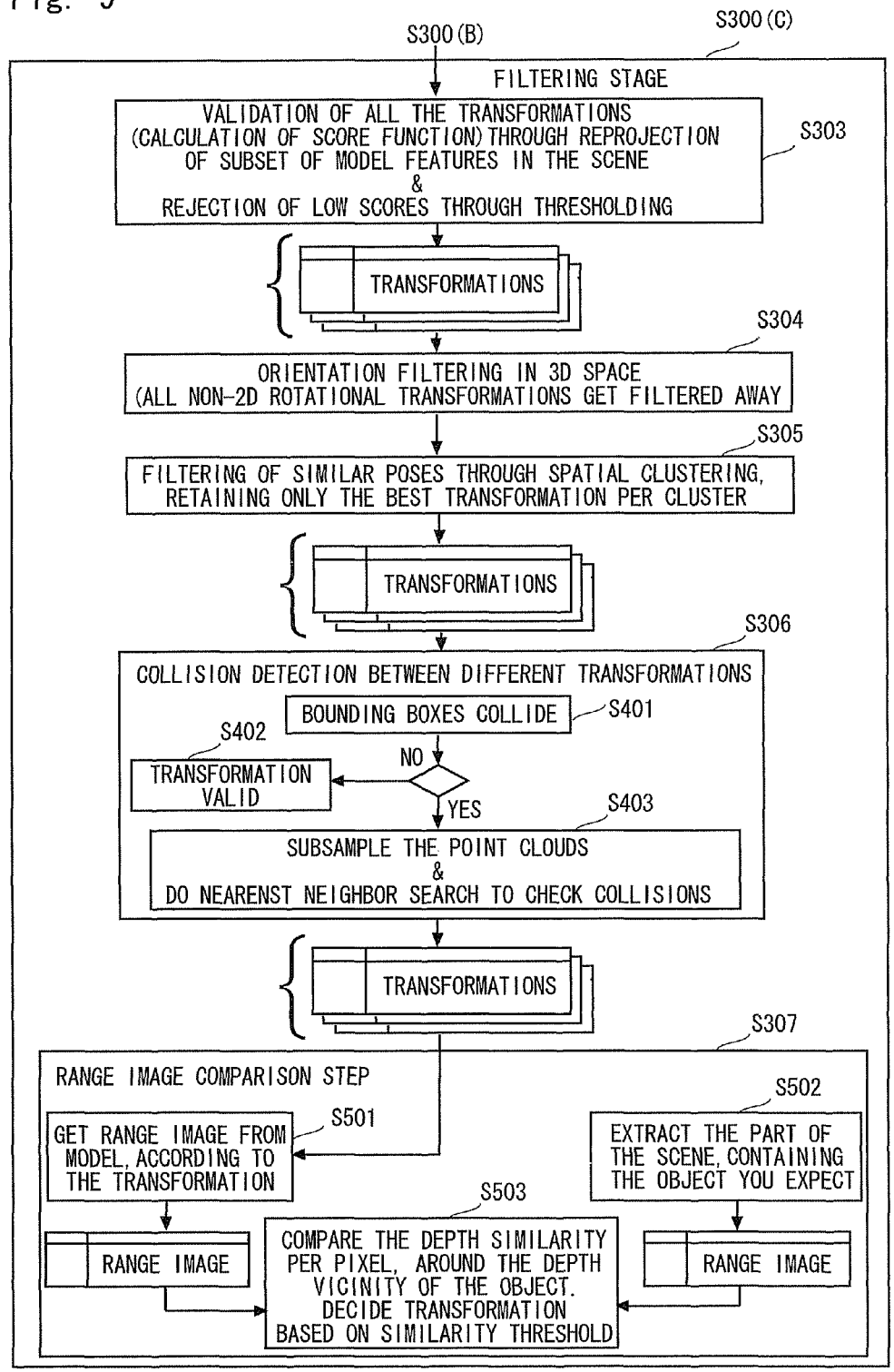
FIG. 9 is a flowchart illustrating the detail of a filtering process in accordance with a first exemplary embodiment of the present invention.

Next, the details of a filtering process in the step S300(C) is explained hereinafter with reference to FIG. 9. FIG. 9 is a flowchart illustrating the detail of a filtering process of unnecessary transformation matrices. In the step S300(C), the number of candidate transformation matrices is reduced by performing a filtering process for all the candidate transformation matrices. Each of the steps S303 to S307 is explained hereinafter.

In the step S303, a score function is calculated by projecting a subset of features of an object model on the current observed scene based on all the candidate transformation matrices. Then, all the candidate transformation matrices are verified by using the calculated score functions. That is, it is determined how well a candidate transformation matrix fits to the observed scene by using a score function.

A score function is based on how well transformed interest points of the object model match with their corresponding points in the observed scene. For this purpose, some uniformly distributed points are selected from a set of interest points of the object model. These selected points are used to validate the transformation. Furthermore, the number of the selected points is typically lower than the number of interest points of the object model used for the above-described matching process so that the validation scoring can be performed efficiently. That is, as described above, since candidate transformation matrices are calculated by using triples of correspondences, it is also necessary to carry out verification for the other interest points whether their calculated transformation matrices are proper or not. Therefore, some interest points of the object model are transformed into the observed scene based on the calculated transformation matrices, and the transformation matrices are evaluated based on the distances between these transformed points and the points of the observed scene.

A score function is explained hereinafter in a more detailed manner. Assume that $V^m = \{v_{m1}, v_{m2}, \ldots, v_{mn}\}$ is a set of validation points among the interest points expressed by a 3D object model. That is, $V^m$ is used to evaluate whether or not a pose of the object model to be transformed matches with the object in the observed scene. By using a transformation matrix $T_{abc}$, $V^s = \{v_{s1}, v_{s2}, \ldots, v_{sn}\}$ is calculated by projecting a pose of each interest point of $V^m$ on the reference coordinate system of the scan. That is, a position and pose obtained by multiplying the pose of an interest point of $V^m$ by the transformation matrix $T_{abc}$ are used as the position and pose of an interest point of $V^s$. Then, a patch is extracted from a range image of the observed scene by using the position and pose of the interest point of $V^s$, and matching is carried out between the extracted patch and the patch of the object model of $V^m$. If the result of this matching is satisfactory, it can be determined that the transformation matrix has satisfactory accuracy with respect to the observed scene. When the transformation matrix $T_{abc}$ is suitable to the observed scene, a lot of points $V^m$ of the object model correspond to points $V^s$ in the observed scene (that is, descriptor vectors match with each other). With this fact, a score function shown below is defined based on the Euclidian distance $d(v_{mi}, v_{si})$ between the descriptor vectors of the corresponding features (i.e., patches).

$$\text{score}(T_{abc}) = \Sigma_i \max(0, 1 - d(v_{mi}, v_{si})/d_{max})$$

In the above-described score function, $d_{max}$ has the same quantity as the quantity explained with the step 300(A). The function max(a,b) outputs a larger one of the values a and b. The resulting value of the scoring function will lie between 0 and n. The more closely the $v_{mi}$ and $v_{si}$ resemble each other, the larger score value is output by the score function. The larger the score value is, the better it indicates the transformation matrix $T_{abc}$ matches with the observed scene. In the step S303, a score is calculated for every candidate transformation matrix, and all transformation matrices that have a score below a predefined threshold are discarded. The calculation of the score is performed for each triple of correspondences, and after the score of the current transformation matrix is computed, the computation is repeated for the subsequent triple of correspondences. The search can be stopped when the maximum number of trials has been reached.

As described above, the approach in accordance with an exemplary aspect of the present invention only requires three correspondences to calculate a candidate transformation matrix. Therefore, it can also handle partial occlusion. Then, in the step S303, a possible pose of the object in the observed scene is returned for every transformation matrix with a score above a predefined threshold.

The computational cost of the candidate transformation matrices can be further reduced by discarding triples of correspondences that seem to be invalid before the process in the above-described step S303 is carried out. For example, we have found it very effective to check whether or not the relative distances between three interest points in the observed scene are similar to the relative distances of the interest points in the object model. That is, with regard to a triangle formed by three interest points in the observed scene, three interest points forming a similar triangle in the object model is searched for, and unnecessary three interest points are discarded based on whether or not the relative distances between these three interest points are similar to each other. Furthermore, when three interest points all lie on a straight line, the correspondences of those points are not used, and only interest points with a relative distances above a predefined threshold are used.

Figure 10:
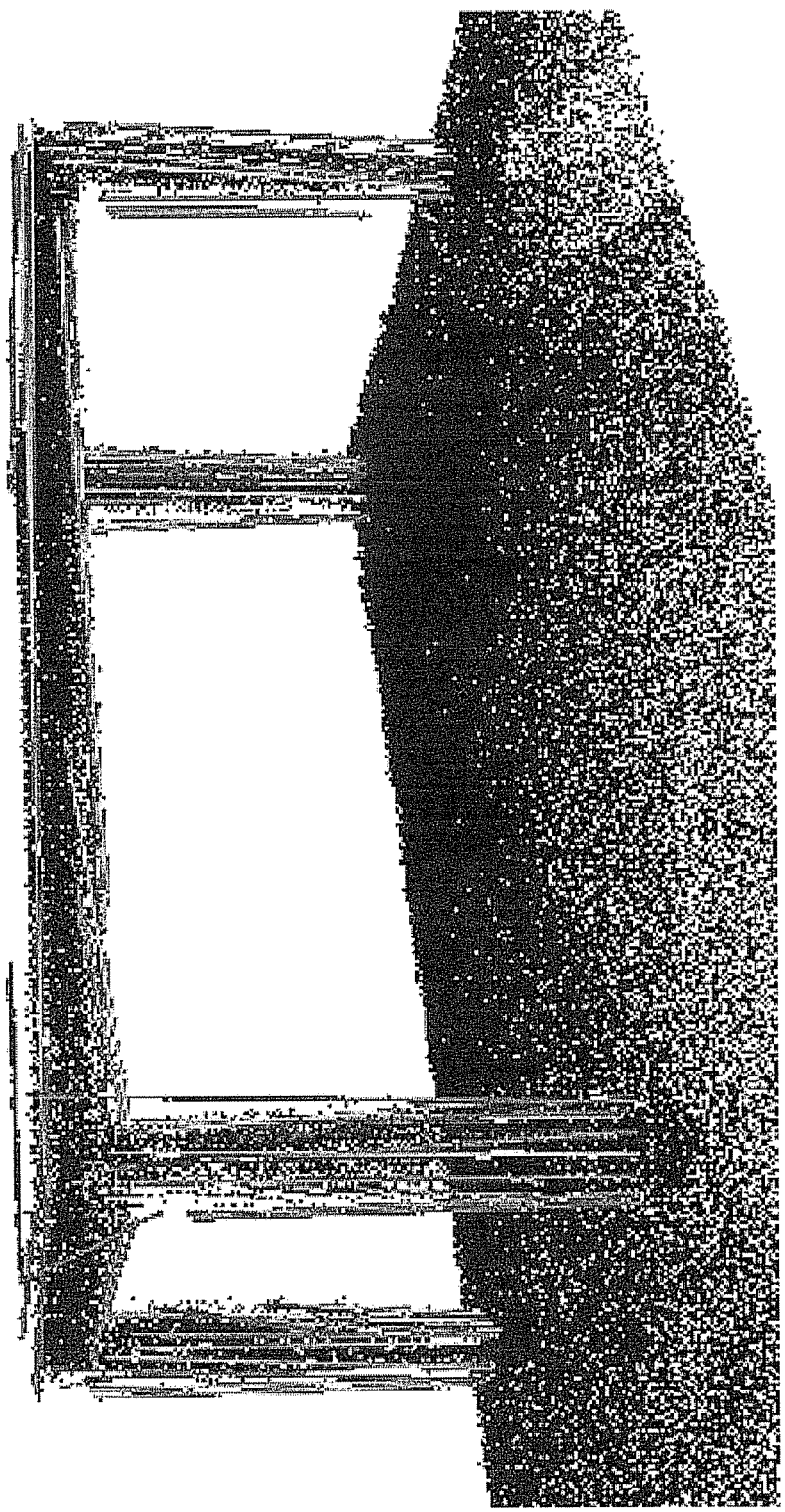
FIG. 10 is an image containing point clouds and line features of an object model of a table in accordance with a first exemplary embodiment of the present invention.

According to the above-described process using features (patches) of interest points, the procedure works well for complex shapes. However, it is difficult to detect features of large structures with only a few distinguishable points like tables or boxes by using the Harris Detector due to the lack of salient features. To cope with these types of objects, line features are also extracted from both the object models and the observed scans. For example, FIG. 10 shows an image containing point clouds and line features extracted from those point clouds of an object model of a table.

When an object is recognized based on lines, the transformation matrix is determined by line features. In a step S301_2, given two correspondences between features of two non-parallel lines are first computed by matching. Correspondences between line features mean, in the case where two non-parallel lines exist in each of an object model and an observed scene, the correspondences between the both ends of the lines. Then, in a step S302_3, when correspondences between features of two lines are obtained, a candidate transformation matrix is calculated in conceptually the same approach as the procedure described above with the step S302_1. More specifically, the process is repeated in a loop over correspondences of all possible corners (e.g., edges of line segments and edges of a desk) in order to calculate the candidate transformation matrices. A score is again computed from the point of validation as described above.

In a step S304, orientation filtering in 3D (three-dimensional) space is carried out on the candidate transformation matrices. Orientation filtering means a process to eliminate all transformation matrices that have a restrained rotational component. For example, when a target object to be recognized is a desk, all candidate transformation matrices for various states of the desk such as a state where the desk is standing by its legs and a state where the desk is upside down on the floor are conceivable. In a practical observed scene, it is possible to effectively eliminate unnecessary transformation matrices by establishing such constraints that the desk could not have been turned upside down. Therefore, for example, in the case of a desk, unnecessary transformation matrices can be filtered out by eliminating transformation matrices having a rotational component around an axis other than the yaw axis (i.e., non-2D rotational transformation).

In a step S305, filtering is carried out for transformation matrices that transform to similar positions through spatial clustering, so that only the best transformation matrix is left in each cluster (area in the observed scene where the target object to be recognized exists). A cluster means a local area in the observed scene where each object to be recognized exists. Typically, the procedure up to the step S304 returns many instances of the object at very similar locations (i.e., outputs many transformation matrices that transform to similar positions/poses). This results from different triples of correspondences that are used to calculate the transformation matrices, and many instances of the object are all originate from the same object to be recognized in the observed scene. Therefore, unnecessary similar solutions (transformation matrices) are eliminated by keeping only the solutions with the highest scores with regard to all objects that are found in local areas and based on transformation matrices.

In a step S306, the candidate transformation matrices are verified according to the presence and absence of collision detection between neighboring solutions. If two nearby solutions are conflicting, the object models that are positioned based on the transformation matrices could possibly collide. This means, for example, a situation where a desk and a chair, both of which are positioned based on the transformation matrices, collide with each other, and a situation where the desk sticks into the floor. Therefore, in a step S401, any collision will be detected by calculating a bounding box defining a predefined boundary range for point clouds of an object model in advance. The detection of collision can be efficiently performed, for example, by using low-resolution point clouds of object models stored in a kd-tree. Specifically, it is performed by storing a bounding box in the kd-tree in advance and then performing collision decision between each object model positioned according to the transformation matrices and the stored bounding box.

In a step S402, when no collision is detected, the transformation matrix is determined to be proper. On the other hand, if a collision is found, further verification is made on the transformation matrix in a step S403. Specifically, after the bounding box is temporarily cancelled, a subset is extracted from the point clouds of the object model, and search for the closest points is carried out at a point-cloud level for the collision check. That is, more detailed collision detection is carried out at the point-cloud level in comparison to the collision decision by the bounding box.

In a step S307, to avoid a false positive where a solution is mistakenly detected, a comparison is made between a range image from the object model positioned based on the transformation matrix and a range image of the observed scene. This is because if the transformation matrix is appropriate, the range image from the object model based on the transformation matrix should resemble the corresponding part of the range image of the observed scene.

The process in the step S307 is explained hereinafter in a more specific manner. Firstly, a low-resolution range image of the object model that is positioned based on the transformation matrix is calculated in a step S501. The calculated range image is a range image in a virtual camera pose. In a step S502, a part containing an object to be detected is extracted from the observed scene, and a range image of that part is calculated. In a step S503, a comparison is made between two calculated sub-images on a pixel-by-pixel basis to calculate the percentage of the area that is identical (within a certain error bound). Transformation matrices for which this calculated value is above a predefined threshold of the degree of similarity are determined as the final transformation matrices. Then, the presence of the object in the pose determined by that transformation matrix in the observed scene is output.

Figure 11:
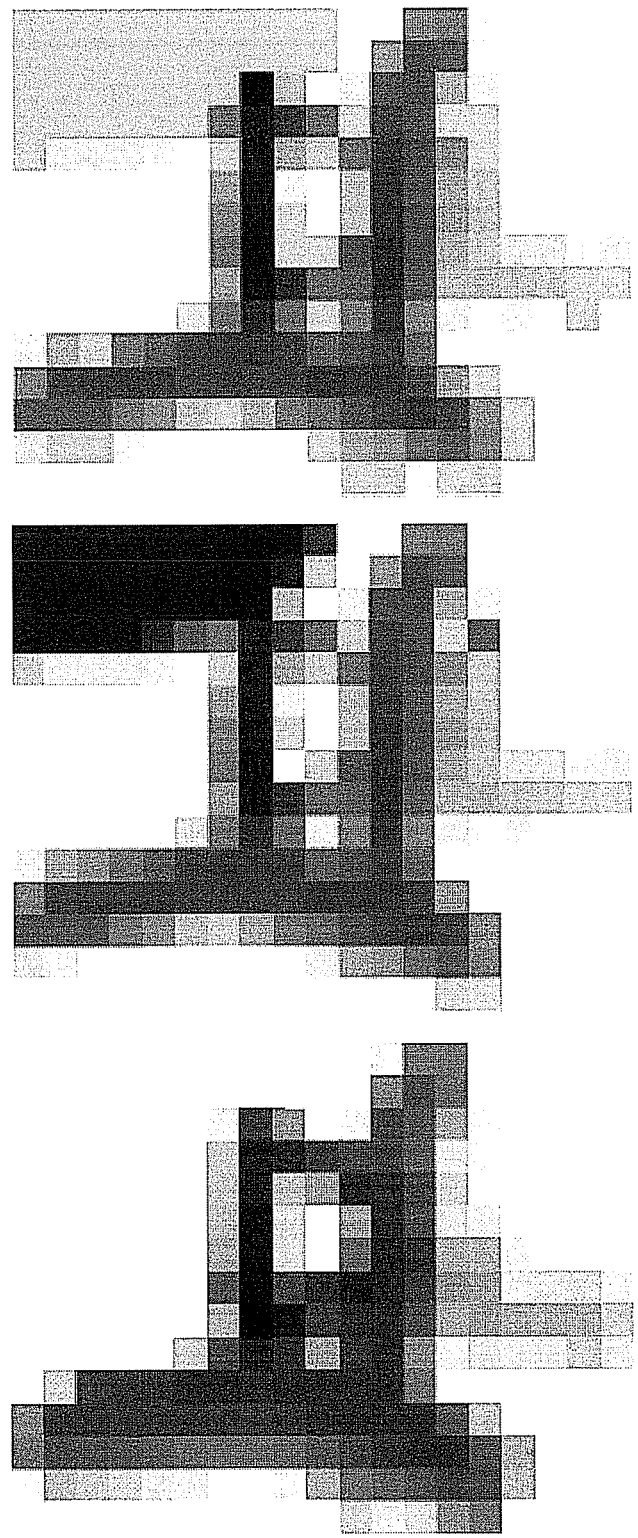
FIG. 11 shows an example of a range image in accordance with a first exemplary embodiment of the present invention.

FIG. 11 shows an example of a range image used in the comparison in the step S503. FIG. 11 shows a sub-image of an object model positioned based on a transformation matrix in a case where the object is a chair (left), a sub-image of a part corresponding to the chair in the observed scene (middle), and an image that is generated by superimposing the left image and the middle image and used to calculate the degree of similarity (right). It should be noted that the black part on the upper-right portion of the middle image corresponds some object that is located in front of and occluding the object to be recognized in the observed scene. Furthermore, in the right image, the parts that are significantly different between the left and middle images (e.g., a part corresponding to the upper-right black part of the right image) are drawn in bluish colors. The example shown in the figure has about 80% hits and was accepted as a correct transformation matrix.

Through the processes up to the step S300(C), the object model in the pose and position determined based on the obtained transformation matrix is finally output in a state where the object model is disposed in the observed scene. That is, the point clouds of the object model disposed based on the transformation matrix is displayed in a state where they are superimposed on the point cloud data in the observed scene. A recognition result like this is output for each object in the observed scene.

Exemplary advantageous effects of the present invention is explained hereinafter.

<Recognition Rate>

Firstly, a recognition rate of an object in a case where an object recognition method and apparatus in accordance with an exemplary aspect of the present invention are used is explained hereinafter with reference to FIGS. 12 and 13. FIG.

12 is an image illustrating the setting of an actual experiment. FIG. 13 is a table showing recognition rates for a group of objects in the experiment setting shown in FIG. 12.

Figure 12:
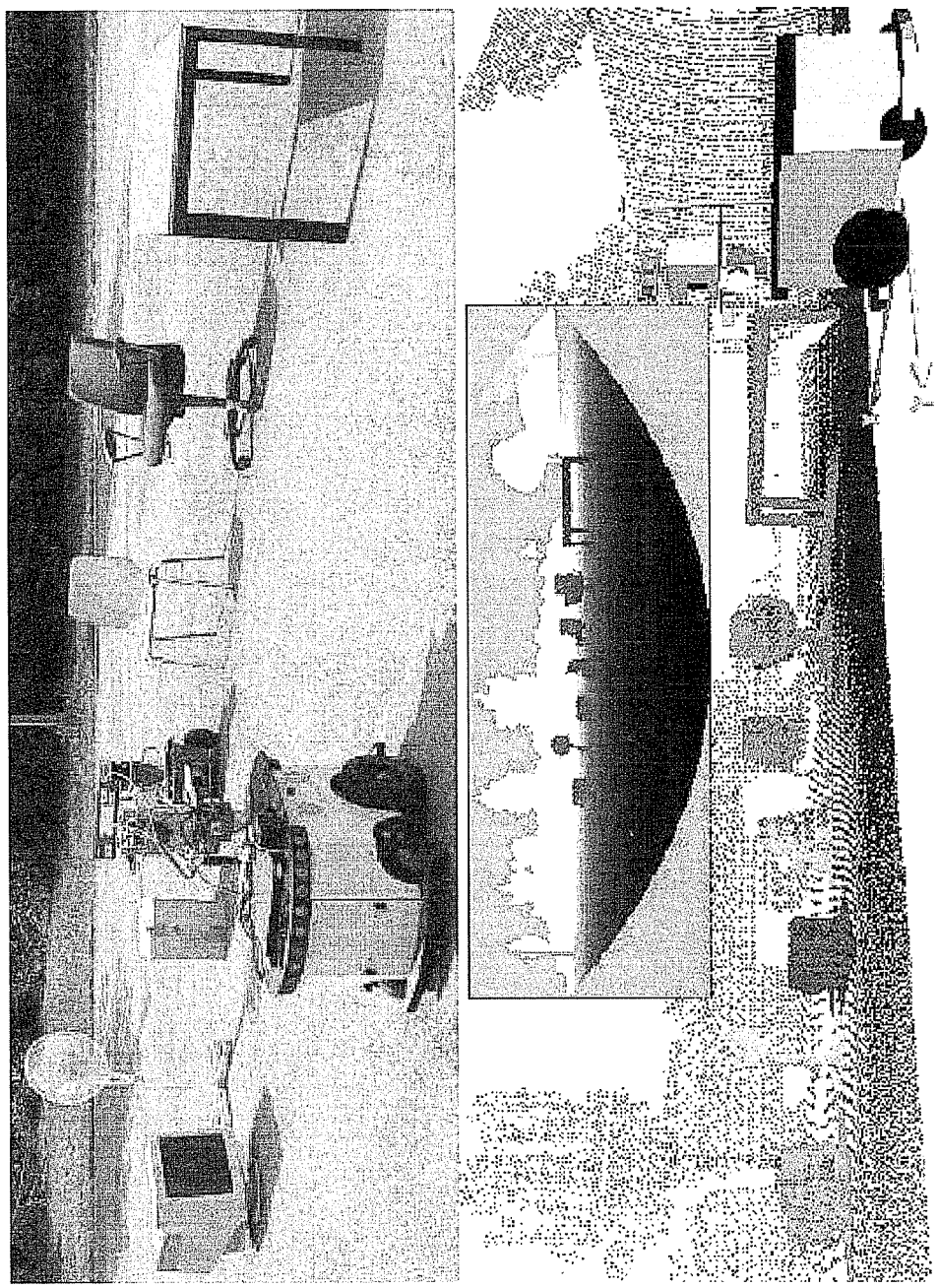
FIG. 12 shows the settings of an actual experiment in accordance with a first exemplary embodiment of the present invention.

The top image in FIG. 12 is an image illustrating an environment for which an experiment was conducted. The environment contains a group of objects (from the left in the figure, a monitor, a fan, a box, a pioneer robot, a wooden chair, an office chair, and a desk are arranged in the listed order) and a robot for scanning the objects that was used in the experiment. A laser range sensor for scanning the observed scene is mounted in the upper-front part of the robot. The laser range sensor measures distances to the objects by radiating a laser in the horizontal direction. The distances to the objects located in an area in front of the robot can be measured by swinging the sensor in the pitch direction by using a PTU.

The bottom image of FIG. 12 shows an image of 3D (three-dimensional) point clouds corresponding to the top image (experiment environment). The 3D point clouds include 3D point clouds for each object existing in the above-described environment. It should be noted that, in the bottom image of FIG. 12, 3D point clouds for objects that are recognized by an object recognition method in accordance with an exemplary aspect of the present invention are drawn with marking. That is, objects are disposed in the bottom image of FIG. 12 based on corresponding output results (recognized objects and their pose information) in accordance with an exemplary aspect of the present invention. The middle image of FIG. 12 shows a range image generated from the bottom image (3D point clouds of the experiment environment). The range image has a fan-like shape in the depth direction according to the shape of a scan range by the laser range sensor.

As shown in FIG. 13, it can be seen that when an object recognition method and apparatus in accordance with an exemplary aspect of the present invention are used, satisfactory recognition rates are achieved for the objects. FIG. 13 shows the number of times an object model of each object is correctly detected corresponding to each object (monitor, fan, box, pioneer robot, wooden chair, office chair, and desk) in the observed scene in the environment shown in FIG. 12. For example, it indicates that the box in the actual observed scene was detected for eight times as a box of the object model, and was detected for two times as an office chair of the object model.

<Recognition and Distance>

Figure 14:
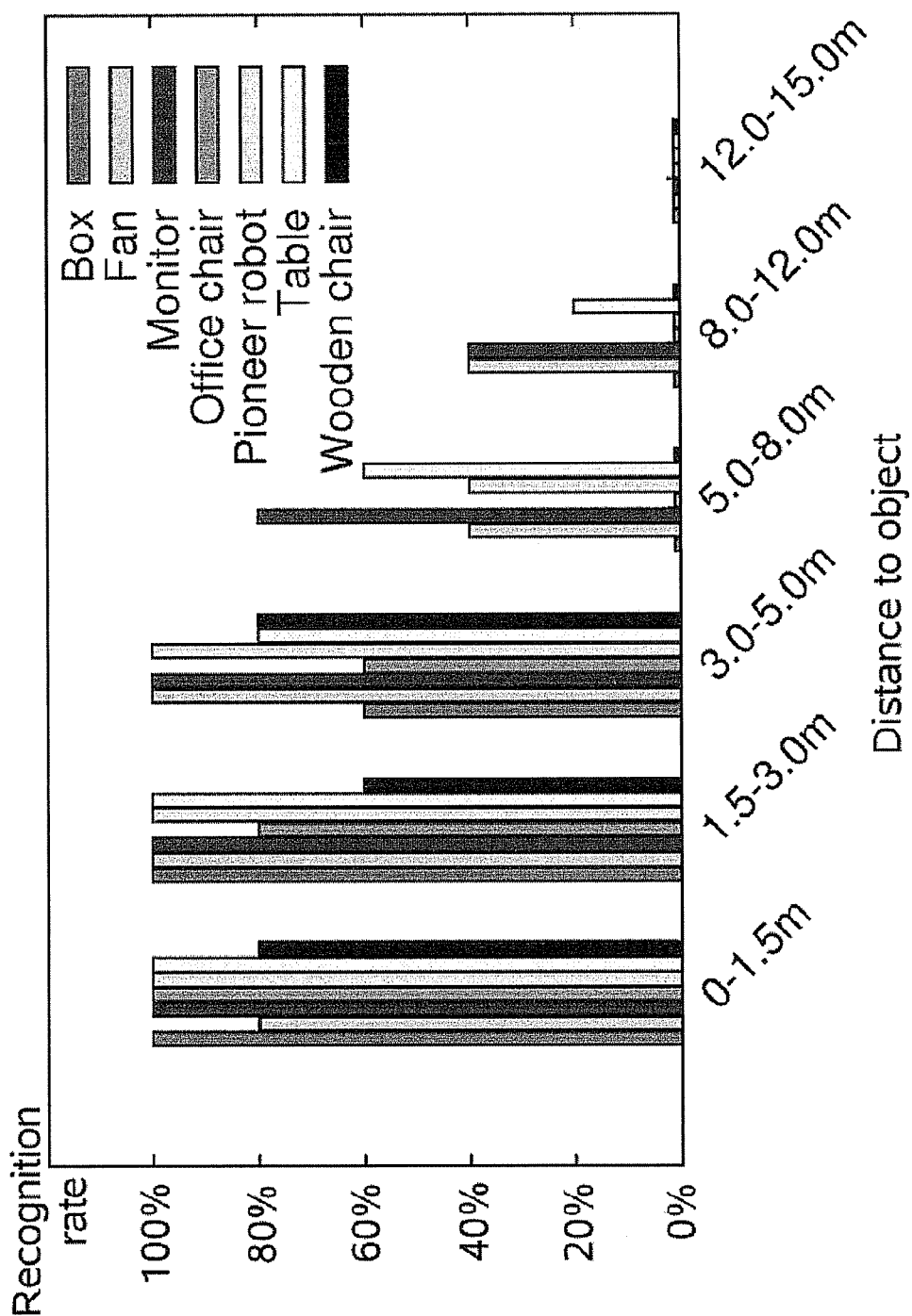
FIG. 14 is a graph showing the relation between distances to the object and recognition rates in accordance with a first exemplary embodiment of the present invention.

FIG. 14 is a graph showing the relation between distances to objects and recognition rates of the objects. Scans were performed for five times each from different points of view of the objects with regard to each stage of the distance. As shown in the figure, the recognition rates of the objects depend on distance to the objects. The reason for this is explained hereinafter. A range image is calculated from point clouds obtained by a laser range scanner. As the sensor has a fixed angular resolution, the density of the point clouds strongly depends on the distance. The maximal resolution of the range image is directly affected by the density of the obtained point clouds. That is, a patch in the range image would be drawn from fewer measurement points than the total number of pixels in the patch. Therefor, it requires interpolation to fill the range image patch, and the interpolation obviously affects the robustness of the recognition.

More specific explanation is made hereinafter. The longer the distance to an object becomes, the larger the range of the real world corresponding to a pixel of the range image becomes (i.e., the coarser the pixels of the range image becomes). For example, in an example of a range image shown in FIG. 5, a patch corresponding to the head of a person has a relatively small size in the real world. However, a patch corresponding to a part in the wall behind the person has a considerably large size in the real world. When patches are generated from the range image, the pixels of patches corresponding to the wall become coarse. This is because since the laser range sensor performs scans in a radial pattern, the parts on which the laser is not actually radiated becomes larger with increase in the distance to the object. In other words, a range image includes patches containing pixels for which distance measurements could not be obtained. Therefore, interpolation is required for the pixels for which distance measurements are not obtained. However, since data that did not actually exist is added in the interpolation, the interpolation obviously affects the robustness of the recognition.

It should be noted that a commercially-available laser range sensor can be used as the acquisition means for point clouds. For example, in case of a laser sensor from SICK K.K. (model "LMS 291"), the angular sensor resolution is 0.25° at most in the lateral direction using the interpolated scanning mode. As shown in FIG. 14, when this laser range sensor is used, the recognition rate starts deteriorating at the point where the distance to the object exceeds 5 m as a result of the sensor resolution.

<Impact of Occlusion on the Recognition>

Figure 15:
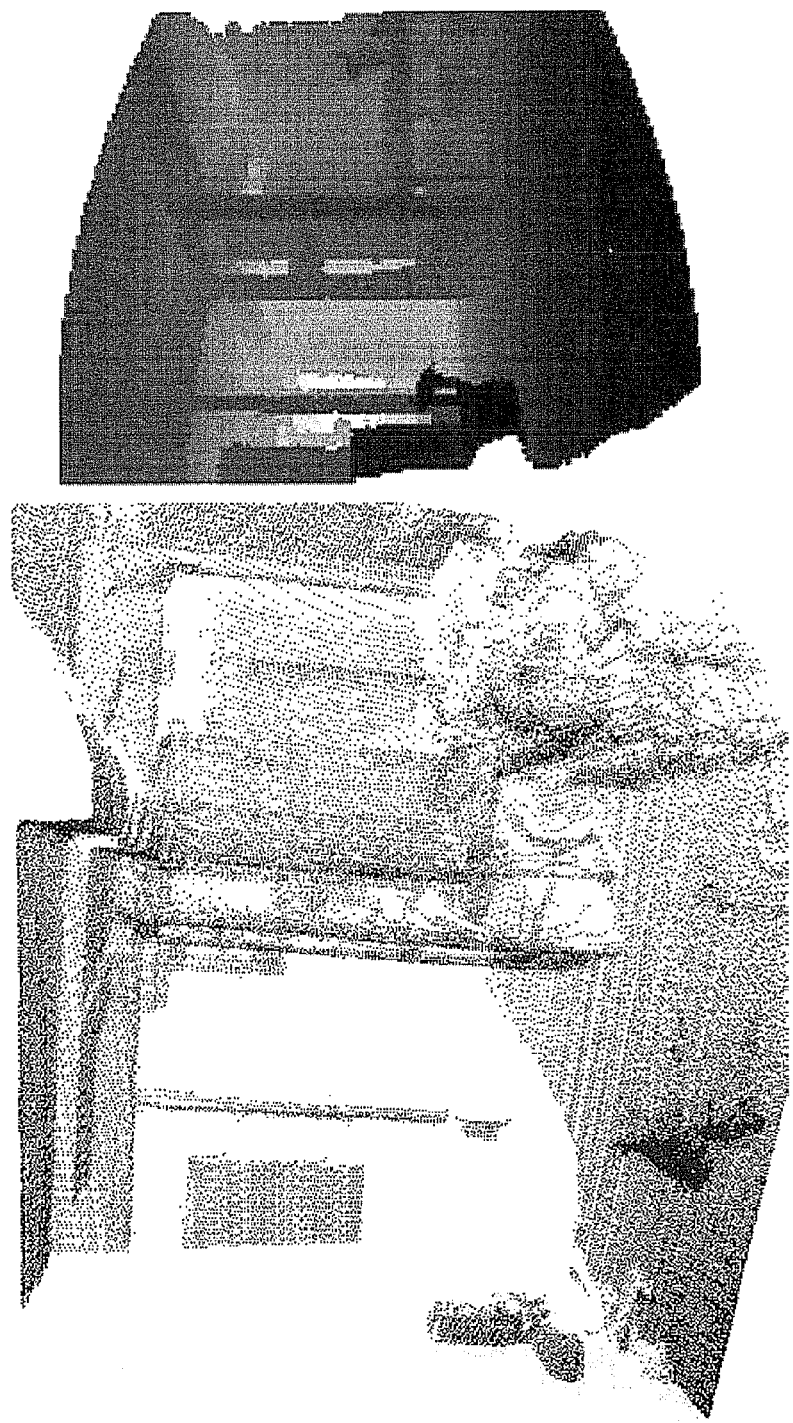
FIG. 15 shows an image of point clouds containing partially occluded objects (left) and a range image (right)

Next, impacts on recognition by occlusion in a case where an object recognition method and apparatus in accordance with an exemplary aspect of the present invention are used are explained hereinafter with reference to FIGS. 15 and 16. FIG. 15 shows an image of point clouds containing partially occluded objects (left) and a range image (right). FIG. 16 is a table showing a recognition result for objects (an office chair and a table) under the circumstance shown in FIG. 15. The table in FIG. 16 shows the number of successful trials for object recognition (out of ten scans respectively) for different percentages of visibility.

A recognition technique in accordance with an exemplary aspect of the present invention does not require a circumstance where the entire object can be visible for the matching process. That is, since patches are generated from some interest points with regard to those interest points and an object is detected by comparing the patches with each other in the matching process, robust recognition can be achieved even in a case where an object is occluded in its substantial parts. As can be seen from FIGS. 15 and 16, though depending on the visible structure of objects, recognition can still achieved with 25-50% of occlusion. For example, the office chair was correctly recognized even though the visibility was less than 50%. From this fact, a recognition technique in accordance with an exemplary aspect of the present invention is also robust against occlusion, whereas the recognition technique disclosed in Non-patent document 2 is strongly affected by a partial occlusion in a silhouette.

<Processing Time Required for Recognition: Data Collection Process>

Next, the processing time required for recognition in a case where an object recognition method and apparatus in accordance with an exemplary aspect of the present invention are used is explained hereinafter. Firstly, the processing time required for a scan data collection process is explained hereinafter.

A recognition technique in accordance with an exemplary aspect of the present invention takes a processing time of 13 seconds for a single scan to obtain point clouds (i.e., requires 13 seconds to generate a range image in one direction). Then, an object model is generated by performing scans from a plurality of directions. This processing time results from the fact that the laser range scanner is a 2D scanning device and the fact that dense point clouds are required in order to obtain sufficient information from the observed scene. It is possible to speed up the point cloud acquisition process by obtaining point clouds having low density. However, point clouds having low density will deteriorates the overall robustness of the recognition technique in accordance with an exemplary aspect of the present invention.

Currently, there is no acceptable hardware available that can give the same amount of data with the same precision in a shorter time span.

<Processing Time Required for Recognition: Recognition Process>

Next, a processing time required for a recognition process is explained hereinafter. In a recognition technique in accordance with an exemplary aspect of the present invention, the object detection from acquired point clouds for seven objects to be recognized takes 1.5-3.0 seconds on a computer equipped with a 2.4 GHz CPU. Therefore, a recognition technique in accordance with an exemplary aspect of the present invention can perform object recognition in a short time by generating a range image from 3D point clouds and then carrying out a features-matching process using the 2D range image.

Furthermore, as a supplemental advantageous effect, recognized objects can be utilized effectively. For example, in SLAM (Simultaneous Localization and Mapping) where estimation of own position and map-making are performed simultaneously, more robust mapping of (dynamic) objects can be achieved while constructing high-dimensional world model by disposing recognized objects on the map.

Other Embodiments

Although 3D point clouds are generated from measurements from a laser range sensor in the above-described exemplary embodiment, the present invention is not limited to this configuration. That is, 3D point clouds may be generated by using an ordinary stereo camera.

Furthermore, although a range image is generated from 3D point clouds in the above-described exemplary embodiment, the present invention is not limited to this configuration. That is, a range image may be directly obtained by using a camera capable of taking a range image. In the case of 3D camera or a stereo camera, the point cloud generation step can be left out, since the output is a range image already.

Furthermore, although the number of candidate transformation matrices is reduced through a plurality of filtering processes in the above-described exemplary embodiment, the present invention is not limited to this configuration. For example, although accuracy of recognition can be improved by carrying out processes in the steps S306 and S307, these processes are not indispensable and may be omitted.

Furthermore, the above-described object recognition function can be realized, for example, by a computer that is provided separately from the computer installed in the robot or from the robot itself. This computer comprises, for example, a central processing unit (CPU), a ROM, a RAM, an auxiliary storage device such as a hard-disk drive, a storage medium driving device to which a portable storage medium such as a CD-ROM is inserted, input means, and output means. Application programs that cooperate with the operating system and provide instructions to the CPU and the like can be stored in the storage media such as the ROM, the auxiliary storage device, and the portable storage medium, and then loaded to the RAM for the execution. These application programs include a characteristic object recognition program peculiar to realize an object recognition method in accordance with an exemplary aspect of the present invention. Object recognition by the object recognition program is implemented, after the central processing unit rolls out the application program on the RAM, by reading or storing data stored in the auxiliary storage device in accordance with that application program.

It should be noted the present invention is not limited to above-described exemplary embodiments, and various modifications can be made to the exemplary embodiments without departing from the spirit of the present invention.

INDUSTRIAL APPLICABILITY

The present invention relates to an object recognition method and apparatus and an autonomous robot capable of recognizing a target object contained in an observed scene by using a preliminarily-created object model, and in particular can be applied to an object recognition technique based on a range image.

| Reference Signs List | |
| --- | --- |
| 101 | POINT CLOUD GENERATION UNIT |
| 102 | RANGE IMAGE GENERATION UNIT |
| 103 | INTEREST POINT DETECTION UNIT |
| 104 | AREA FEATURE EXTRACTION UNIT |
| 105 | LINE FEATURE EXTRACTION UNIT |
| 106 | OBJECT MODEL STORAGE UNIT |
| 107 | MATCHING/VERIFICATION PROCESS UNIT |

The invention claimed is:

1. An object recognition method for recognizing a target object contained in an observed scene by using a preliminarily-created object model, the object recognition method comprising:

a step for generating a range image of the observed scene;

a step for detecting interest points from the generated range image of the observed scene;

a step for extracting first featuresof an area from the generated range image of the observed scene as the first features, the area being centered on the detected interest points and composed of pixels of a predetermined size, and in the area, range values of other pixels contained in that area being shifted by using a range value of a pixel located on a center of that area as a reference value;

a step for carrying out a matching process between the first features and second features, the second features being features of an area in the range image of the object model;

a step for calculating a plurality of candidate transformation matrices from correspondence between the first features and the second features obtained by the matching process, the plurality of candidate transformation matrices being for projecting the second features on a coordinate system of the observed scene;

a step for projecting the second features on the observed scene based on each of the transformation matrices, calculating scores based on a degree of similarity between the projected second features and the first features, discarding transformation matrices for which the scores are lower than a predefined threshold among the plurality of the transformation matrices, and verifying validity of each of the transformation matrices based on the calculated scores; and a step for recognizing the target object with respect to the object model based on the transformation matrix.

2. The object recognition method according to claim 1, further comprising a step for generating a 3D point cloud of the observed scene by using a laser sensor,
wherein the range image is generated from the generated 3D point cloud.

3. The object recognition method according to claim 1, further comprising:
a step for generating a 3D point cloud of the observed scene by using a laser sensor; and
a step for extracting third features from the 3D point cloud of the observed scene, the third features being features of a line contained in the target object;
wherein the step for carrying out the matching process carries out a matching process between the third features and fourth features, the fourth features being features of a line of the object model, and
the step for calculating a transformation matrix calculates a transformation matrix based on a result of the matching process, the transformation matrix being for projecting the third features on the coordinate system of the observed scene.

4. The object recognition method according to claim 1, wherein the step for verifying the validity of the transformation matrix classifies the plurality of the transformation matrices in each local area containing the target object, and selects one transformation matrix for each of the local areas according to the scores.

5. The object recognition method according to claim 4, wherein when the second features are disposed based on the transformation matrices that are selected for each of the local areas, the step for verifying the validity of the transformation matrix detects a collision between object models of the disposed second features, and verifies the validity of the transformation matrices that are selected for each of the local areas according to the detected collision situation.

6. The object recognition method according to claim 1, wherein the step for verifying the validity of the transformation matrix discards transformation matrices that have a restrained rotational component among the plurality of the transformation matrices.

7. The object recognition method according to claim 1, wherein when the second features are disposed based on each of the transformation matrices, the step for verifying the validity of the transformation matrix generates a range image from the disposed second features, and verifies the validity of each of the transformation matrices according to the degree of similarity between the generated range image and a range image of a part containing the target object extracted from the range image of the observed scene.

8. The object recognition method according to claim 1, further comprising a step for outputting an object model recognized as the target object in a state where the object model is disposed in the coordinate system of the observed scene based on the transformation matrix.

9. An object recognition apparatus for recognizing a target object contained in an observed scene by using a preliminarily-created object model, the object recognition apparatus comprising:
a range image generation section that generates a range image of the observed scene;
an interest point detection section that detects interest points from the range image of the observed scene;
an area feature extraction section that extracts features of an area from the generated range image of the observed scene as first features, the area being centered on the detected interest points and composed of pixels of a predetermined size, and in the area, range values of other pixels contained in that area being shifted by using a range value of a pixel located on a center of that area as a reference value; and
a matching/verification process section that: carries out a matching process between the first features and second features, the second features being features of an area in the range image of the object model; calculates a plurality of candidate transformation matrices from correspondence between the first features and the second features obtained by the matching process, the plurality of candidate transformation matrices being for projecting the second features on a coordinate system of the observed scene; projects the second features on the observed scene based on each of the calculated transformation matrices; calculates scores based on a degree of similarity between the projected second features and the first features; discards transformation matrices for which the scores are lower than a predefined threshold among the plurality of the transformation matrices; verifies validity of each of the transformation matrices based on the calculated scores; and recognizes the target object with respect to the object model based on the transformation matrix.

10. The object recognition apparatus according to claim 9, further comprising a point cloud generation section that generates a 3D point cloud of the observed scene by using a laser sensor,
wherein the range image generation section generates the range image from a 3D point cloud generated by the point cloud generation section.

11. The object recognition apparatus according to claim 9, further comprising:
a point cloud generation section that generates a 3D point cloud of the observed scene by using a laser sensor; and
a line feature extraction section that extracts third features from the 3D point cloud of the observed scene, the third features being features of a line contained in the target object,
wherein the matching/verification process section carries out a matching process between the third features and fourth features, the fourth features being features of a line of the object model, and calculates a transformation matrix based on a result of the matching process, the transformation matrix being for projecting the third features on the coordinate system of the observed scene.

12. The object recognition apparatus according to claim 9, wherein the matching/verification process section classifies the plurality of the transformation matrices in each local area containing the target object, and selects one transformation matrix for each of the local areas according to the scores.

13. The object recognition apparatus according to claim 12, wherein when the second features are disposed based on the transformation matrices that are selected for each of the local areas, the matching/verification process section detects a collision between object models of the disposed second features, and verifies the validity of the transformation matrices that are selected for each of the local areas according to the detected collision situation.

14. The object recognition apparatus according to claim 9, wherein the matching/verification process section discards transformation matrices that have a restrained rotational component among the plurality of the transformation matrices.

15. The object recognition apparatus according to claim 9, wherein the matching/verification process section when the second features are disposed based on each of the transformation matrices, generates a range image from the disposed second features, and verifies the validity of each of the transformation matrices according to the degree of similarity between the generated range image and a range image of a part containing the target object extracted from the range image of the observed scene.

16. The object recognition apparatus according to claim 9, wherein the matching/verification process section outputs an object model recognized as the target object in a state where the object model is disposed in the coordinate system of the observed scene based on the transformation matrix.

17. An autonomous mobile robot that creates map information by using a recognition result of an object existing in the environment and autonomously moves by referring to the created map information, the autonomous mobile robot comprising:
   range image generation device that generates a range image of an observed scene;
   an interest point detection device that detects interest points from the generated range image of the observed scene;
   an area feature extraction device that extracts features of an area from the generated range image of the observed scene as first features, the area being centered on the detected interest points and composed of pixels of a predetermined size, and in the area, range values of other pixels contained in that area being shifted by using a range value of a pixel located on a center of that area as a reference value; and
   a matching/verification process device that: carries out a matching process between the first features and second features, the second features being features of an area in the range image of a preliminarily-created object model; calculates a plurality of candidate transformation matrices from correspondence between the first features and the second features obtained by the matching process, the plurality of candidate transformation matrices being for projecting the second features on a coordinate system of the observed scene; projects the second features on the observed scene based on each of the calculated transformation matrices; calculates scores based on a degree of similarity between the projected second features and the first features; discards transformation matrices for which the scores are lower than a predefined threshold among the plurality of the transformation matrices; verifies validity of each of the transformation matrices based on the calculated scores; and recognizes the target object with respect to the object model based on the transformation matrix.

* * * * *

UNITED STATES PATENT AND TRADEMARK OFFICE
CERTIFICATE OF CORRECTION

PATENT NO.       : 8,630,456 B2                                  Page 1 of 1
APPLICATION NO. : 13/320220
DATED            : January 14, 2014
INVENTOR(S)      : Asahara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this
Twenty-second Day of September, 2015

Michelle K. Lee
*Director of the United States Patent and Trademark Office*